(12) United States Patent
Murthy

(10) Patent No.: US 10,902,130 B2
(45) Date of Patent: Jan. 26, 2021

(54) GUIDING AUTOMATED TESTING OF BINARY PROGRAMS

(71) Applicant: FUJITSU LIMITED, Kawasaki (JP)

(72) Inventor: Praveen Murthy, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 327 days.

(21) Appl. No.: 15/898,607

(22) Filed: Feb. 18, 2018

(65) Prior Publication Data
US 2019/0258803 A1    Aug. 22, 2019

(51) Int. Cl.
*G06F 21/57*    (2013.01)
*G06F 11/36*    (2006.01)

(52) U.S. Cl.
CPC ........ *G06F 21/577* (2013.01); *G06F 11/3688* (2013.01); *G06F 11/3692* (2013.01); *G06F 2221/033* (2013.01)

(58) Field of Classification Search
CPC ............... G06F 11/3688; G06F 21/577; G06F 11/3684; G06F 11/3692; G06F 2221/033
See application file for complete search history.

(56) References Cited

U.S. PATENT DOCUMENTS

| 8,417,998 | B2 | 4/2013 | Thomas et al. | |
| 8,966,453 | B1* | 2/2015 | Zamfir | G06F 11/3604 714/38.1 |
| 9,411,964 | B1* | 8/2016 | Moritz | G06F 21/54 |
| 2010/0058475 | A1 | 3/2010 | Thummalapenta et al. | |
| 2012/0317647 | A1* | 12/2012 | Brumley | G06F 21/563 726/25 |
| 2013/0086299 | A1* | 4/2013 | Epstein | G06F 12/1433 711/6 |
| 2013/0160121 | A1* | 6/2013 | Yazdani | G06F 21/566 726/23 |

(Continued)

OTHER PUBLICATIONS

Godefroid, P., Peleg, H., & Singh, R. (Oct. 2017). Learn&fuzz: Machine learning for input fuzzing. In Proceedings of the 32nd IEEE/ACM International Conference on Automated Software Engineering (pp. 50-59). IEEE Press.

(Continued)

*Primary Examiner* — Ali S Abyaneh
*Assistant Examiner* — Shu Chun Gao
(74) *Attorney, Agent, or Firm* — Maschoff Brennan

(57) ABSTRACT

According to an aspect of an embodiment, a method may include guiding automated testing of a binary program with respect to a potentially vulnerable location. The method may include obtaining a first basic block of a first binary program and comparing the first basic block with a second basic block of a second binary program. The comparison may be in response to the second basic block having been previously identified as having a vulnerability. The method may further include identifying the first basic block as a potentially vulnerable location based on a correspondence between the first basic block and the second basic block. The correspondence may be indicated by the comparison of the first basic block with the second basic block. The method may further include guiding a testing execution of the first binary program based on the identification of the first basic block as the potentially vulnerable location.

18 Claims, 6 Drawing Sheets

(56) References Cited

U.S. PATENT DOCUMENTS

| | | | | |
|---|---|---|---|---|
| 2013/0276056 A1* | 10/2013 | Epstein | ............... | G06F 9/45558 |
| | | | | 726/1 |
| 2013/0312103 A1* | 11/2013 | Brumley | ............... | G06F 21/577 |
| | | | | 726/25 |
| 2014/0082327 A1* | 3/2014 | Ghose | .................... | G06F 11/00 |
| | | | | 712/205 |
| 2016/0119148 A1* | 4/2016 | Ghose | ................... | G06F 21/602 |
| | | | | 713/176 |
| 2018/0365573 A1* | 12/2018 | Sultana | .................... | G06N 5/04 |
| 2019/0138725 A1* | 5/2019 | Gupta | ..................... | G06F 21/54 |

OTHER PUBLICATIONS

Stevens, R., Suciu, O., Ruef, A., Hong, S., Hicks, M., & Dumitraş, T. (Jan. 17, 2017). Summoning demons: The pursuit of exploitable bugs in machine learning. arXiv preprint arXiv:1701.04739.

Garcia, F. D., de Koning Gans, G., & Verdult, R. (Aug. 8, 2011). Vulnerability Extrapolation: Assisted Discovery of Vulnerabilities Using Machine Learning.

Ognawala, S., Hutzelmann, T., Psallida, E., & Pretschner, A. (Dec. 12, 2017). Improving Function Coverage with Munch: A Hybrid Fuzzing and Directed Symbolic Execution Approach. arXiv preprint arXiv:1711.09362.

* cited by examiner

GUIDING AUTOMATED TESTING OF BINARY PROGRAMS

FIELD

The embodiments discussed herein are related to guiding automated testing of binary programs.

BACKGROUND

Binary programs may be tested using automated testing methods. A purpose of testing binary programs may be to discover potential vulnerabilities in the binary programs. Some automated testing methods generate random inputs to test the binary programs. Automated testing of binary programs using random inputs may be a fast method of testing the binary programs; but, it may miss testing a significant number of branches of the binary programs. Other automated testing methods may be directed at providing more complete branch coverage of the binary program; but at the cost of speed.

SUMMARY

According to an aspect of an embodiment, a method of guiding automated testing of a binary program with respect to a potentially vulnerable location is disclosed. The method may include obtaining a first basic block of a first binary program. The method may further include comparing the first basic block with a second basic block of a second binary program. The comparison may be in response to the second basic block having been previously identified as having a vulnerability. The method may further include identifying the first basic block as a potentially vulnerable location based on a correspondence between the first basic block and the second basic block. The correspondence may be indicated by the comparison of the first basic block with the second basic block. The method may further include guiding a testing execution of the first binary program based on the identification of the first basic block as the potentially vulnerable location.

The object and advantages of the embodiments will be realized and achieved at least by the elements, features, and combinations particularly pointed out in the claims.

It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
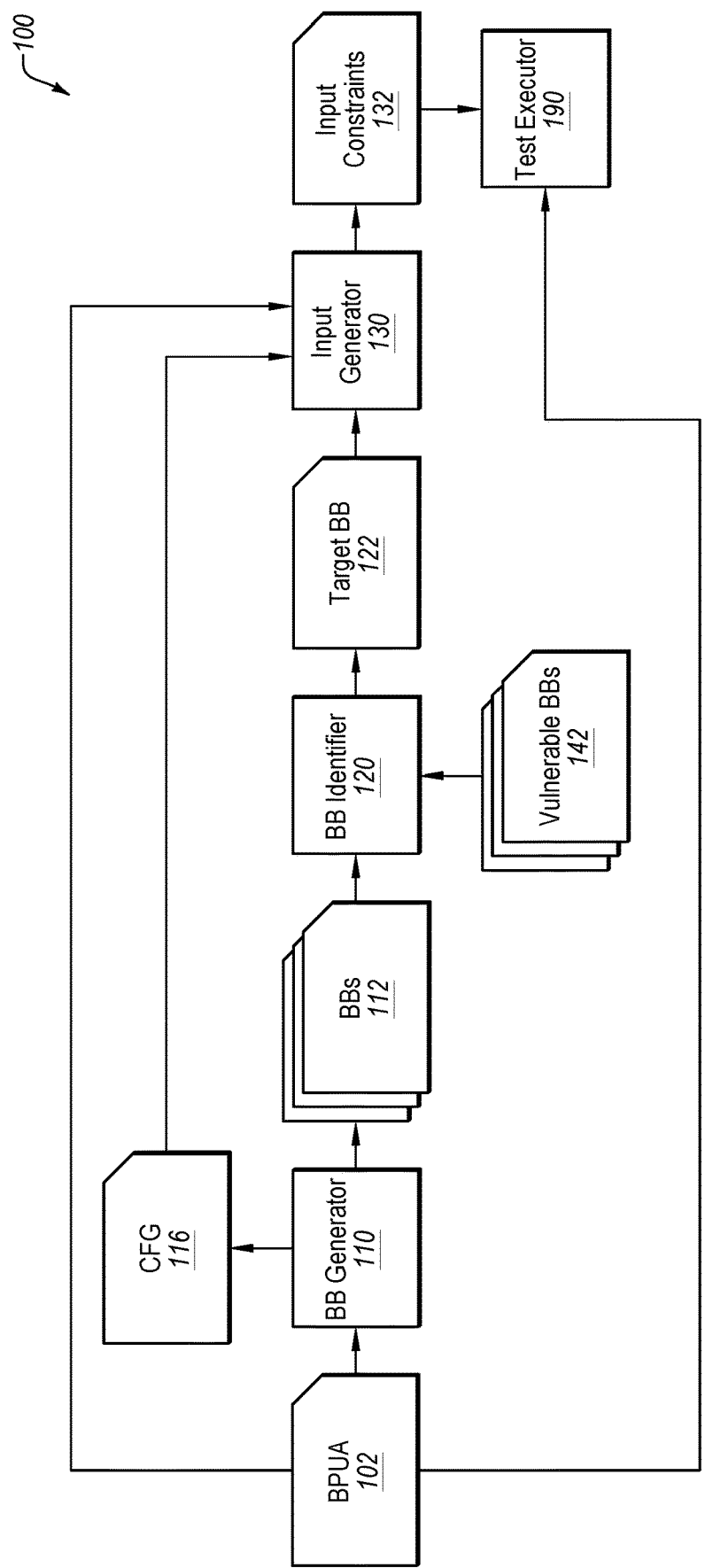
FIG. 1 is a block diagram of an example environment configured to guide automated testing of a binary program with respect to a potentially vulnerable location.

Systems and methods related to guiding automated testing of a binary program to a potentially vulnerable location are disclosed in the present disclosure. Vulnerabilities in the binary program may include coding errors, design oversights, bugs, areas vulnerable to exploitation, or other vulnerabilities in the binary code that allow for unexpected, unintended or undesirable results. The vulnerabilities in the binary program may cause the binary program to crash, hang, fail, or to perform unexpected, unintended, or undesirable operations. The vulnerabilities in the binary program may be reached based on unexpected inputs. For example, a vulnerability may be reached by a malicious user of the binary program deliberately entering unexpected inputs into the binary program.

In some embodiments, the potentially vulnerable location may be identified within the binary program. For example, a binary program under analysis (BPUA) may be split into basic blocks (BBs). The BBs may be compared with a vulnerable BB, which may be a BB that has been previously identified as having a vulnerability and that comes from another binary program. If a compared BB has a correspondence to the vulnerable BB, the compared BB may be identified as a target BB that may be designated as the potentially vulnerable location. As described below, in some embodiments automated testing that may be performed to test the BPUA for vulnerabilities may be guided based on the identification of the target BB as the potentially vulnerable location. For example, the test execution may be guided such that the target BB is encountered during the test execution to determine whether the target BB is in fact a vulnerable location. The identification of the target BB as the potentially vulnerable location may thus improve the automated testing of the BPUA by increasing the efficacy and/or efficiency of the testing execution, which may improve the technological field of testing and debugging software programs such as binary programs.

In some embodiments, identifying constraints of inputs with respect to the target BB may be used to help guide the test execution. For example, one or more techniques of automatic execution may be used on the BPUA. The techniques of automatic execution may include automatic execution based on random inputs (fuzzing), forward symbolic execution, and backward symbolic execution. The techniques of automatic execution may store inputs and/or constraints relative to the execution of the BPUA. The techniques of automatic execution may also store data relating to points reached in the BPUA. The inputs, constraints, and data related to points reached in the BPUA may be used to guide the test execution as detailed below.

Identifying the potentially vulnerable location (e.g., target BB) and identifying constraints of inputs relative to the potentially vulnerable location may enable automated testing to focus testing of the binary program on the potentially vulnerable location. Focusing testing on the potentially vulnerable location may enable the automated testing to discover vulnerabilities that might not have been discovered without focusing on the potentially vulnerable location. Identifying the potentially vulnerable location and identifying constraints of inputs with respect to the vulnerable location may better focus the automated testing to test the branches of the binary program that are more likely to have vulnerabilities. Identifying the potentially vulnerable location and identifying constraints of inputs with respect to the vulnerable location may provide more complete, more strategic, more efficient, or better branch coverage than automated testing using random inputs. Identifying the potentially vulnerable location and identifying constraints of inputs with respect to the potentially vulnerable location may allow for faster or more efficient testing than testing that attempts to provide complete or relatively complete branch coverage of the binary program. Thus, identifying the potentially vulnerable location and identifying constraints of inputs with respect to the vulnerable location may improve the efficiency of the automated testing.

FIG. 1 is a block diagram of an example environment 100 related to automated testing of a binary program with respect to a potentially vulnerable location, arranged in accordance with at least one embodiment described in this disclosure. In some embodiments, the environment 100 may include a basic block generator 110 (BB generator 110), a basic block identifier 120 (BB identifier 120), an input generator 130, and a test executor 190. The environment 100 may guide test execution of a binary program under analysis 102 (BPUA 102) with respect to the potentially vulnerable location.

In general, the environment 100 may be used to guide test execution of the BPUA 102 with respect to the potentially vulnerable location. For example, the environment 100 may use the BB generator 110 to generate BBs 112 and a control flow graph 116 (CFG 116) from the BPUA 102. Additionally or alternatively the environment 100 may use the BB identifier 120 to identify a target basic block 122 (target BB 122) from among the BBs 112 based on a comparison between the BBs 112 and vulnerable basic blocks 142 (vulnerable BBs 142). Additionally or alternatively the environment 100 may use the input generator 130 to generate the input constraints 132 for the BPUA 102 with respect to the target BB 122. Additionally or alternatively, the environment 100 may use the test executor 190 to test the BPUA 102 with respect to the target BB 122 based on the input constraints 132.

The BPUA 102 may include code and/or routines encoded in binary form and stored on a non-transitory computer-readable storage medium for execution by a processing device. Although the code and/or routines of the BPUA 102 may include portions that may be interpreted by a human as text, the code and/or routines of the BPUA 102 may not be human-readable. In these and other embodiments, the code and routines may be machine readable. For example, the code and/or routines may be binary or some other machine readable format.

In some embodiments the environment 100 may include the BB generator 110 which may include code and routines configured to enable a computing system to perform one or more operations to disassemble the BPUA 102 into the BBs 112. Additionally or alternatively, the BB generator 110 may be implemented using hardware including a processor, a microprocessor (e.g., to perform or control performance of one or more operations), a field-programmable gate array (FPGA), or an application-specific integrated circuit (ASIC). In some other instances, the BB generator 110 may be implemented using a combination of hardware and software. In the present disclosure, operations described as being performed by the BB generator 110 may include operations that the BB generator 110 may direct a system to perform.

The BBs 112 may be a subset of the code and/or routines of the BPUA 102. The BBs 112 may include sets of instructions to be carried out by a computer processor. The set of instructions that makes up a single BB may be determined to be the instructions that are undertaken before a jump, or transition to another BB. For example, a first BB may include instructions in assembly language which may include example instructions 1-4 as follows: 1) read a first value from a first memory location, 2) read a second value from a second memory location, 3) compare the first value to the second value, and 4) then jump to a second BB based on the comparison.

The BPUA 102 may be made up of any number of BBs 112. For example, in some instances, the BPUA 102 may be made up of tens, hundred, thousands, tens of thousands, etc., of BBs 112. The BBs 112 may include every BB of the BPUA 102, alternatively, the BBs 112 may include only a subset of the BBs of the BPUA 102. For example, the BPUA 102 may be analyzed and/or disassembled into functions, the BBs 112 may come from a function of the BPUA 102.

Additionally or alternatively certain BBs may be excluded from analysis as part of the BBs 112. For example, certain BBs may be of a type or follow a pattern that has been determined to unlikely to contain vulnerabilities, such as for example a bunch of "nops." In some embodiments, the patterns or BB types that may be used to determine which BB's to exclude may be included in a pattern library. In some embodiments, the patterns or BB types may be included in the pattern library based on them being of the types or having patterns of BBs of already existing code that have been indicated as having very few or no errors. Thus, certain BBs that may be part of the BPUA 102 may be excluded from becoming a part of the BBs 112 such that the BBs 112 may include a subset of the BBs of the BPUA 102.

In these or other embodiments the BB generator 110 may be configured to generate the CFG 116, which may be a relational map of the BBs 112 in the BPUA 102. The CFG 116 may include nodes that may represent BBs and may include edges that may represent jumps or transitions between BBs. Distance between BBs 112 in the CFG 116 may be a measure of how many jumps occur between one BB and another BB. For example, the distance between a first BB and a second BB may be four, representing four jumps between BBs to get from the first BB to the second BB.

In some embodiments the vulnerable BBs 142 may include one or more BBs from a different binary program. Alternatively the vulnerable BBs 142 may include one or more BBs from the BPUA. The vulnerable BBs 142 may have been previously identified to have a vulnerability. For example operations that may be used to identify the vulnerable BBs 142 are described in regard to FIG. 3.

In some embodiments the environment 100 may include the BB identifier 120 which may include code and routines configured to enable a computing system to perform one or more operations to compare two or more BBs. Additionally or alternatively the BB identifier 120 may be implemented using hardware including a processor, a microprocessor (e.g., to perform or control performance of one or more operations), a field-programmable gate array (FPGA), or an application-specific integrated circuit (ASIC). In some other instances, the BB identifier 120 may be implemented using a combination of hardware and software. In the present disclosure, operations described as being performed by the BB identifier 120 may include operations that the BB identifier 120 may direct a system to perform.

In some embodiments the BB identifier 120 may be configured to compare the BBs 112 and the vulnerable BBs 142. The BB identifier 120 may compare some or all of the BBs 112 generated by the BB generator 110 from the BPUA 102. In some embodiments, the BB identifier 120 may individually compare each of the BBs 112, individually, with each of the vulnerable BBs 142 to determine correspondences between the BBs 112 and the vulnerable BBs 142. Additionally or alternatively, as discussed in further detail below, a particular BB of the BBs 112 may be identified as the target BB 122 based on one or more associated correspondences between the particular BB 112 and one or more of the vulnerable BBs 142. The correspondences may be based on a similarity between the instructions of an individual BB of the BBs 112 and the instructions of an individual vulnerable BB of the vulnerable BBs 142. For example operations that may be used by the BB identifier 120 to compare BBs are described in regard to FIG. 4.

The BB identifier 120 may be configured to compare more than one BB from the BBs 112 with more than one BB of the vulnerable BBs 142. Additionally or alternatively, the BB identifier 120 may be configured to select an individual BB from the BBs 112 to compare with the vulnerable BBs 142. Additionally or alternatively, the BB identifier 120 may be configured to select an individual vulnerable BB from the vulnerable BBs 142 to compare with the BBs 112. In these or other embodiments, the BB identifier 120 may be configured to perform more than one comparison at a time.

In some embodiments, the target BB 122 may be identified as being potentially vulnerable based on its determined correspondence with one or more of the vulnerable BBs 142. For example, the determined correspondence for the target BB 122 may indicate a relatively high degree of similarity between the target BB 122 and one or more particular vulnerable BBs 142. Because the one or more particular vulnerable BBs 142 may have a vulnerability, the correspondence between the target BB 122 and the one or more vulnerable BBs 142 may thus indicate that the target BB 122 may also have a vulnerability.

In some embodiments, the BB identifier 120 may produce a similarity index that may indicate degrees of similarity between the BBs 112 and one or more vulnerable BBs 142. In these or other embodiments, the BB identifier 120 may identify the target BB 122 based on the similarity index.

For example, in some embodiments, the similarity index may include a value for each of the BBs 112 that may indicate a degree of similarity of the corresponding BB 112 with one or more of the vulnerable BBs 142, as indicated by the correspondences determined from the comparisons. In some embodiments, the particular BB 112 may be identified as the target BB 122 based on a comparison of the similarity index value against a threshold. For instance, the particular BB 112 may be identified as the target BB 122 based on its corresponding similarity index value satisfying the threshold. In some embodiments the threshold may be determined based on a comparison between one or more BBs 112 with the vulnerable BBs 142. For example, in some embodiments the threshold may be set such that the top 10% of the BBs 112 with the most similarity to the vulnerable BBs 142 would be identified as the target BB 122. In some embodiments, the threshold may be associated with a particular degree of similarity. For example, in some embodiments, the threshold may be associated with a 60% degree of similarity such that a BB 112 with a similarity index value that indicates a 60% or greater degree of similarity may be identified as a target BB 122.

In some embodiments, the threshold may be determined based on a heuristic analysis that may indicate a relationship between a degree of similarity with a BB known to be vulnerable and those unknown to be vulnerable but that turn out to be vulnerable after further examination. Additionally or alternatively, the threshold may be determined based on particular operation constraints. For example, a less stringent threshold may be used such that more of the BBs 112 are identified as a target BB 122, which may also result in slower testing.

Further, as indicated above, a particular BB 112 may be compared with more than one vulnerable BB 142. So, the particular BB 112 may have more than one similarity index value in some embodiments. For example, in some instances, the particular BB 112 may have a similarity index value for each vulnerable BB 142 to which it is compared. In these or other embodiments, the similarity index value for the particular BB 112 may be an average of the multiple similarity index values that may be determined for the particular BB 112. Additionally or alternatively, the similarity index value for the particular BB 112 may be the highest of the multiple similarity index values that may be determined for the particular BB 112. The identification of the particular BB 112 as the target BB 122 may be based on any one of the similarity index values, which may be based on any one of the comparisons of the particular BB 112 with the any one of the vulnerable BBs 142.

Additionally or alternatively the identification of the particular BB 112 as the target BB 122 may be made based on the particular BB 112 having a higher similarity index value than a similarity index value of one or more other BBs of the BBs 112. For example, for a single vulnerable BB of the vulnerable BBs 142, the BB of the BBs 112 that has the highest similarity index may be identified as the target BB 122. Additionally or alternatively, for a single vulnerable BB, of the vulnerable BBs 142, only the BBs of the BBs 112 that have a similarity index in the top ten percent of all similarity indices relative to the vulnerable BB may be identified as target BBs. Although, the present example is given with the context of identifying the particular BB 112 as the target BB 122, any number of BBs 112 may be identified as a target BB within the scope of the present disclosure. In other words, in some embodiments, multiple BBs 112 may be identified as target BBs 122 that may be potentially vulnerable.

In some embodiments the environment 100 may include the input generator 130 which may include code and routines configured to enable a computing system to perform one or more operations to identify input constraints 132 for the BPUA 102 with respect to the location of the target BB 122. Additionally or alternatively the input generator 130 may be implemented using hardware including a processor, a microprocessor (e.g., to perform or control performance of one or more operations), a field-programmable gate array (FPGA), or an application-specific integrated circuit (ASIC). In some other instances, the input generator 130 may be implemented using a combination of hardware and software. In the present disclosure, operations described as being performed by the input generator 130 may include operations that the input generator 130 may direct a system to perform.

In some embodiments the input generator 130 may be configured to obtain the target BB 122 and may be configured to use one or more techniques of automatic execution to execute the BPUA 102. The one or more techniques of automatic execution may be configured to execute the BPUA 102 to reach the target BB 122 during the execution of the BPUA 102. The one or more techniques of automatic execution may store inputs and/or constraints of inputs to the BPUA 102. The input generator 130 may combine and/or solve the inputs and/or constraints stored by the one or more techniques of automatic execution to generate the input constraints 132. The input constraints 132 may be a set of inputs and/or constraints that may be able to guide an execution of the BPUA 102 from a particular point (e.g., the beginning of the BPUA 102) to the target BB 122. For example operations that may be used to generate inputs, similar to the operation of the input generator 130 are described in regard to FIG. 5.

The input constraints 132 may be used in automated testing of the BPUA 102, to reach and test the target BB 122. This may be advantageous because the target BB 122 may be a potentially vulnerable location. Thus, the environment 100 may enable the automated testing to identify and/or test vulnerabilities in the BPUA 102 more quickly or efficiently than the automated testing may be able to without the environment 100.

In some embodiments the environment 100 may include the test executor 190 which may include code and routines configured to enable a computing system to perform one or more operations to execute and/or test the BPUA 102 with respect to the target BB 122. Additionally or alternatively the test executor 190 may be implemented using hardware including a processor, a microprocessor (e.g., to perform or control performance of one or more operations), a field-programmable gate array (FPGA), or an application-specific integrated circuit (ASIC). In some other instances, the test executor 190 may be implemented using a combination of hardware and software. In the present disclosure, operations described as being performed by the test executor 190 may include operations that the test executor 190 may direct a system to perform.

In some embodiments the test executor 190 may execute the BPUA 102 based on the input constraints 132. For example, in general, a binary program may be executed using automated testing techniques in which the automated testing techniques may be provided with inputs and/or constraints. The automated testing techniques may then execute the binary program using the inputs and/or constraints as inputs to the binary program initially, and/or during execution of the binary program. The providing of inputs and/or constraints to an automated testing technique may be a way of guiding the automated test execution.

Therefore, in some embodiments, the input constraints 132 may guide the test executor 190 to test the potentially vulnerable location by guiding the test executor 190 to the target BB 122. The test executor 190 may execute the BPUA 102 multiple times based on input constraints 132 or inputs similar to, or derived from input constraints 132. The test executor 190 may employ one or more techniques of automated execution, for example, fuzzing or symbolic execution, in testing the BPUA 102 relative to the input constraints 132. Because the input constraints 132 are based on the target BB 122, and the target BB 122 may be the potentially vulnerable location, executing tests on the BPUA 102 based in the input constraints 132 may include testing the potentially vulnerable location of the BPUA 102.

Modifications, additions, or omissions may be made to the environment 100 without departing from the scope of the present disclosure. For example, in some embodiments automated execution of the BPUA 102 may occur both as part of the input generator 130 and as part of test executor 190. The input generator 130 may execute testing with respect to the target BB 122. In these or other embodiments the test executor 190 may be omitted or may be included as part of the input generator 130. For another example, the environment 100 may be provided with a BB to test, and thus the operation of the BB generator 110 may be limited or omitted. Additionally or alternatively a CFG 116 may be provided, and thus part of the operation of the BB generator 110 may be omitted. Further, the order of operations may vary according to different implementations.

Figure 2:
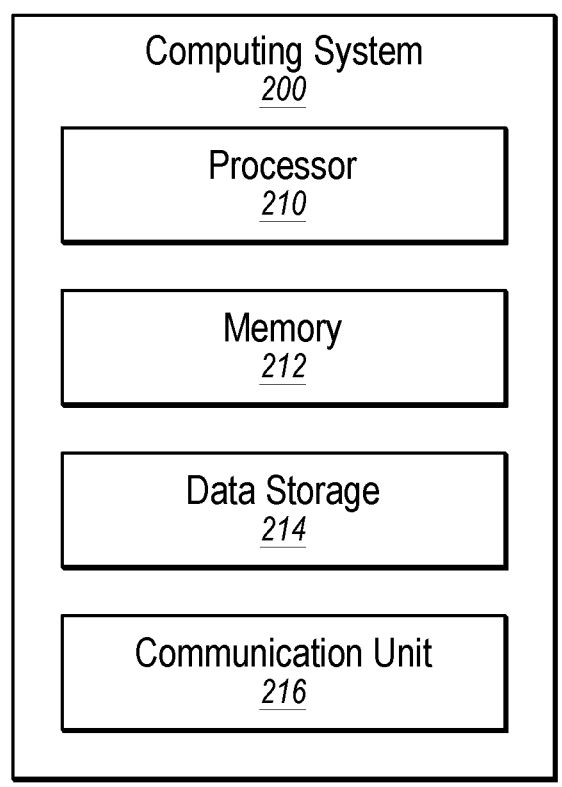
FIG. 2 is a block diagram of an example computing system.

FIG. 2 is a block diagram of an example computing system 200, which may be arranged in accordance with at least one embodiment described in this disclosure. As illustrated in FIG. 2, the system 200 may include a processor 210, a memory 212, a data storage 214, and a communication unit 216.

Generally, the processor 210 may include any suitable special-purpose or general-purpose computer, computing entity, or processing device including various computer hardware or software modules and may be configured to execute instructions stored on any applicable computer-readable storage media. For example, the processor 210 may include a microprocessor, a microcontroller, a digital signal processor (DS), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, it is understood that the processor 210 may include any number of processors distributed across any number of network or physical locations that are configured to perform individually or collectively any number of operations described herein. In some embodiments, the processor 210 may interpret and/or execute program instructions and/or process data stored in the memory 212, the data storage 214, or the memory 212 and the data storage 214. In some embodiments, the processor 210 may fetch program instructions from the data storage 214 and load the program instructions in the memory 212. After the program instructions are loaded into the memory 212, the processor 210 may execute the program instructions, such as instructions to perform one or more operations described with respect to the environment 100, the environment 300, the BB identifier 420, the input generator 530 and/or the method 600 of FIGS. 1, 3, 4, 5, and 6, respectively.

The memory 212 and the data storage 214 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 210. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 210 to perform a certain operation or group of operations.

The communication unit 216 may be configured to receive a binary program and to provide the binary program to the data storage 214. Additionally or alternatively, the communication unit 216 may be configured to receive one or more BBs and to provide the BBs to the data storage 214. In some embodiments, the communication unit 216 may be configured to receive inputs and/or constraints for the binary program. The communication unit 216 may be configured to provide the inputs and/or constraints to the data storage 214. After being received by the data storage 214, the binary program and inputs and/or constraints may be executed using the processor 210 with the inputs and/or inputs generated based on the constraints as input. In some embodiments, inputs, constraints, and/or mutated inputs may be provided outside the system 200 using the communication unit 216.

Modifications, additions, or omissions may be made to the system 200 without departing from the scope of the present disclosure. For example, the data storage 214 may be located in multiple locations and accessed by the processor 210 through a network.

Figure 3:
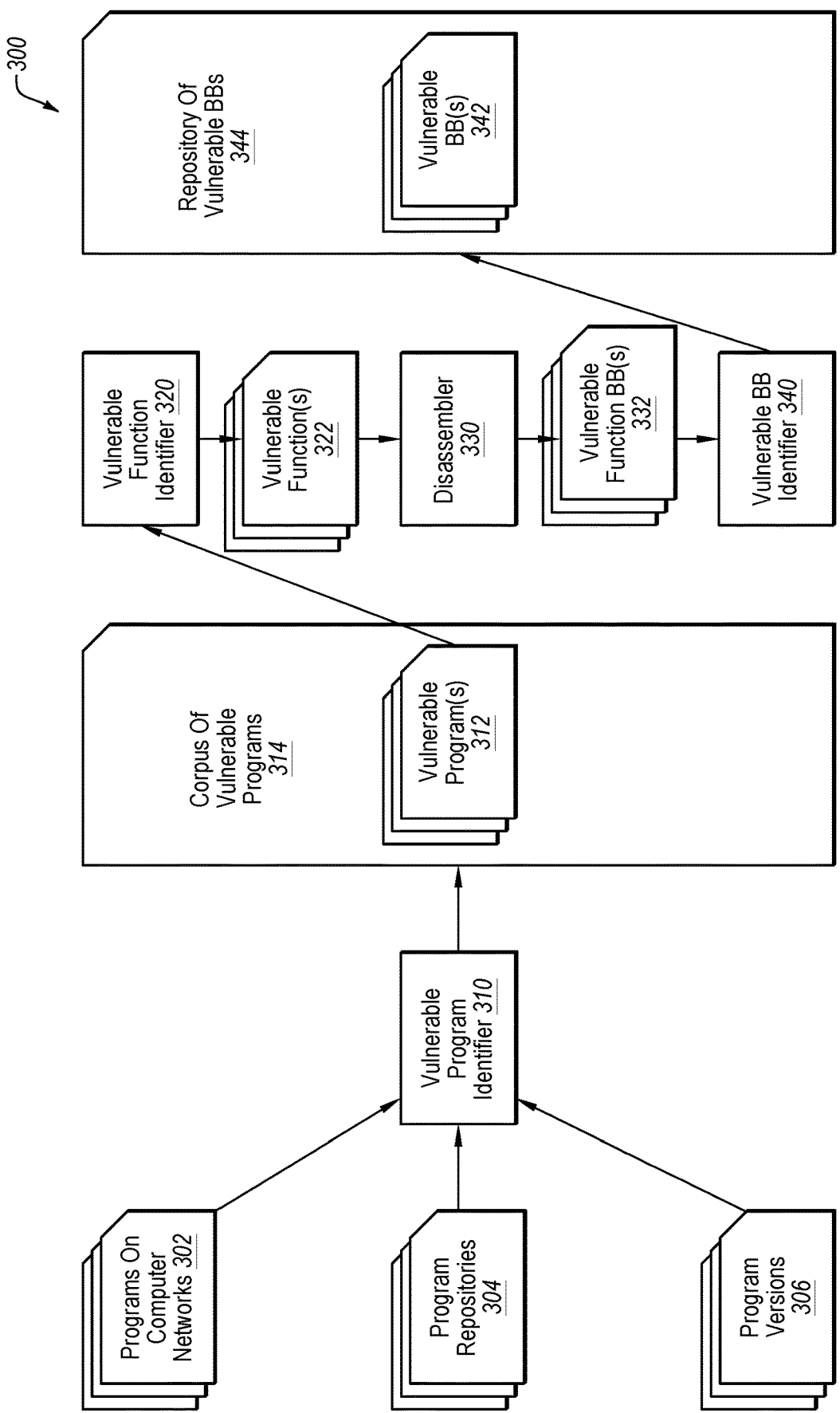
FIG. 3 is a block diagram of an example environment configured to identify a basic blocks that may have a vulnerability.

FIG. 3 is a block diagram of an example environment 300 configured to identify a basic block that may have a vulnerability arranged in accordance with at least one embodiment described in this disclosure. In some embodiments, the environment 300 may include a vulnerable program identifier 310, a vulnerable function identifier 320, a disassembler 330, and a vulnerable basic block identifier 340 (vulnerable BB identifier 340). The environment 300 may identify one or more vulnerable basic blocks 342 (vulnerable BBs 342) from a number of sources. The vulnerable BBs 342 may be analogous to the vulnerable BBs 142 of FIG. 1.

The environment 300 may include the vulnerable program identifier 310 which may include code and routines configured to enable a computing system to perform one or more operations to search through programs on computer networks 302, program repositories 304, program versions 306, and/or other sources of programs to identify vulnerable BBs 342. Additionally or alternatively, the vulnerable program identifier 310 may be implemented using hardware including a processor, a microprocessor (e.g., to perform or control performance of one or more operations), a field-programmable gate array (FPGA), or an application-specific integrated circuit (ASIC). In some other instances, the vulnerable program identifier 310 may be implemented using a combination of hardware and software. In the present disclosure, operations described as being performed by the vulnerable program identifier 310 may include operations that the vulnerable program identifier 310 may direct a system to perform.

In some embodiments the programs on computer networks 302 may include computer programs found on a computer network, including a LAN, WAN or the internet. In some embodiments the program repositories 304 may include programs found in databases, or other repositories of programs. In some embodiments the program versions 306 may include multiple versions of the same program, for example, patched versions of programs. It may be that different versions of a program in the program versions 306 may include a fix for a vulnerability. The programs on computer networks 302, the program repositories 304, and/or the program versions 306 may include binary programs, or programs in other formats for example programming code.

In some embodiments, the environment 300 may include the vulnerable program identifier 310. The vulnerable program identifier 310 may obtain and/or identify one or more vulnerable programs 312 from many sources, including programs on computer networks 302, program repositories 304, and/or program versions 306. In some embodiments, the vulnerable program identifier 310 may rely on outside sources of information to identify the vulnerable program 312. For example, the vulnerable program identifier 310 may rely on tags, comments, meta-data, bug reports or other indicators to identify the vulnerable program 312. The vulnerable program identifier 310 may identify the vulnerable program 312 based on where the vulnerable program 312 was located. For example, the vulnerable program identifier 310 may identify the vulnerable program 312 based on the vulnerable program 312 being in a database, collection, or repository of programs that have been previously identified to have a vulnerability. For another example, the vulnerable programs 312 may identify a program with a subsequent version, for example a program found in the program versions 306, as the vulnerable programs 312 based on the presumption that the subsequent version addressed or presented a fix for a vulnerability.

The vulnerable program 312 may be stored in a corpus of vulnerable programs 314. The vulnerable program identifier 310 may add additional binary programs to the corpus of vulnerable programs 314 over time. The vulnerable program identifier 310 may translate or compile code into a binary program for inclusion in the corpus of vulnerable programs 314.

In these or other embodiments, the environment 300 may include the vulnerable function identifier 320 which may include code and routines configured to enable a computing system to perform one or more operations to identify one or more functions within the vulnerable program 312 which may have a vulnerability (vulnerable function 322). Additionally or alternatively, the vulnerable function identifier 320 may be implemented using hardware including a processor, a microprocessor (e.g., to perform or control performance of one or more operations), a field-programmable gate array (FPGA), or an application-specific integrated circuit (ASIC). In some other instances, the vulnerable function identifier 320 may be implemented using a combination of hardware and software. In the present disclosure, operations described as being performed by the vulnerable function identifier 320 may include operations that the vulnerable function identifier 320 may direct a system to perform.

In some embodiments the vulnerable function identifier 320 may identify the vulnerable functions 322. The vulnerable functions 322 may be identified from the vulnerable programs 312 based on one or more sources of information related to functions of the vulnerable programs 312 to identify the vulnerable functions 322. For example, the vulnerable function identifier 320 may rely on tags, comments, meta-data, bug reports or other indicators related to functions of the vulnerable programs 312 to identify the vulnerable functions 322.

The environment 300 may include the disassembler 330 which may include code and routines configured to enable a computing system to perform one or more operations to disassemble the vulnerable functions 322 into basic blocks of the vulnerable function (vulnerable function BBs 332). Additionally or alternatively, the disassembler 330 may be implemented using hardware including a processor, a microprocessor (e.g., to perform or control performance of one or more operations), a field-programmable gate array (FPGA), or an application-specific integrated circuit (ASIC). In some other instances, the disassembler 330 may be implemented using a combination of hardware and software. In the present disclosure, operations described as being performed by the disassembler 330 may include operations that the disassembler 330 may direct a system to perform.

Additionally or alternatively the disassembler 330 may disassemble an entire vulnerable program 312. The disassembler 330 may be similar in operation to the BB generator 110 of FIG. 1. The disassembler 330 may be configured to disassemble the vulnerable functions 322 or the vulnerable programs 312 using any suitable technique, such as, for example, a linear sweep technique and/or a recursive technique In some embodiments, the environment 300 may include the vulnerable BB identifier 340 which may include code and routines configured to enable a computing system to perform one or more operations to identify the vulnerable BBs 342 from among the vulnerable function BBs 332. Additionally or alternatively, the vulnerable BB identifier 340 may be implemented using hardware including a processor, a microprocessor (e.g., to perform or control performance of one or more operations), a field-programmable gate array (FPGA), or an application-specific integrated circuit (ASIC). In some other instances, the vulnerable BB identifier 340 may be implemented using a combination of hardware and software. In the present disclosure, operations described as being performed by the vulnerable BB identifier 340 may include operations that the vulnerable BB identifier 340 may direct a system to perform.

In some embodiments the vulnerable BB identifier 340 may identify one or more vulnerable BBs of the vulnerable BBs 342 based on a comparison between the vulnerable function BBs 332 and another basic block that is known to have a vulnerability. Additionally or alternatively a user, or an automated test technique may identify the vulnerable BB 342. The vulnerable BB 342 may be identified based on a vulnerability being located within the vulnerable BB 342.

In some embodiments, the vulnerable BBs 342 may be stored in a repository of vulnerable basic blocks 344 (repository of vulnerable BBs 344). One or more vulnerable BBs 342, which may be part of the repository of vulnerable BBs 344, may be used in the environment 100 as the vulnerable BBs 142. The vulnerable BB identifier 340 may add additional basic blocks to the repository of vulnerable BBs 344 over time. For example, if a vulnerability is discovered during an execution of a binary program, the BB of the binary program that includes the vulnerability may be included in the repository of vulnerable BBs 344.

Modifications, additions, or omissions may be made to the environment 300 without departing from the scope of the present disclosure. For example, the vulnerable program identifier 310 may be omitted. In these or other embodiments the vulnerable function identifier 320 may operate on programs from programs on computer networks 302, program repositories 304, and/or program versions 306 without the intervening identification of the vulnerable programs 312 by the vulnerable program identifier 310. For another example, the vulnerable programs 312 may not be stored in the corpus of vulnerable programs 314. For another example, in some embodiments the vulnerable function identifier 320 may be omitted. In these or other embodiments the disassembler 330 may disassemble the vulnerable programs 312 into vulnerable function BBs 332 without the intervening identification of the vulnerable functions 322 by the vulnerable function identifier 320. For another example, the vulnerable BB identifier 340 may be omitted. In these or other embodiments the vulnerable function BBs 332 may be included in the vulnerable BBs 342 without the intervening identification of the vulnerable BB 342 by the vulnerable BB identifier 340. Further, the order of operations may vary according to different implementations.

Figure 4:
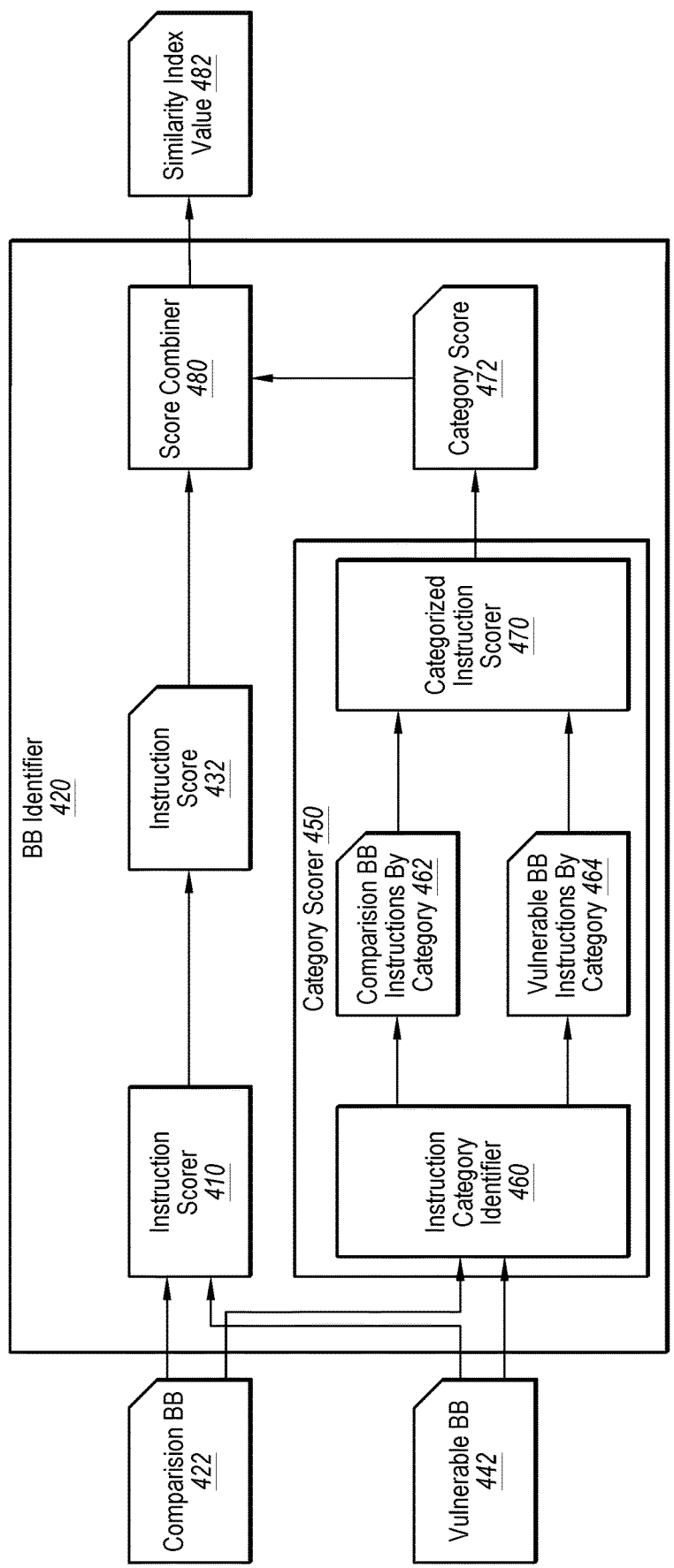
FIG. 4 is a block diagram of an example basic block identifier configured to identify a correspondence between basic blocks.

FIG. 4 is a block diagram of an example basic block identifier 420 (BB identifier 420) configured to identify correspondences between BBs, arranged in accordance with at least one embodiment described in this disclosure. The BB identifier 420 may compare instructions of the BBs to determine a correspondence between the BBs. For example, in some embodiments the BB identifier 420 may compare the instructions of the BBs to determine whether the instructions of the two BBs are similar, identical, belong to the same category, or are otherwise related.

In some embodiments, the BB identifier 420 may be configured to compare a comparison basic block 422 (comparison BB 422) and vulnerable basic block 442 (vulnerable BB 442) to determine a correspondence between the comparison BB 422 and the vulnerable BB 442. In some embodiments, the BB identifier 420 may generate a similarity index value 482 that may be based on the determined correspondence between the vulnerable BB 442 and the comparison BB 422. The BB identifier 420 may be analogous to the BB identifier 120 of FIG. 1. The comparison BB 422 may be analogous to one of the BBs 112 of FIG. 1. The vulnerable BB 442 may be analogous to one of the vulnerable BBs 142 of FIG. 1. In some instances, the similarity index value 482 may indicate that the comparison BB 422 may be used as the target BB 122 in the environment 100 of FIG. 1. Additionally, FIG. 4 describes the operations of the BB identifier 420 using the comparison BB 422 and the vulnerable BB 442 to ease the explanation. However, the BB identifier 420 may be configured to perform the operations with respect to any number of basic blocks.

The BB identifier 420 may include code and routines configured to enable a computing system to perform one or more operations to compare two or more basic blocks. Additionally or alternatively, the BB identifier 420 may be implemented using hardware including a processor, a microprocessor (e.g., to perform or control performance of one or more operations), a field-programmable gate array (FPGA), or an application-specific integrated circuit (ASIC). In some other instances, the BB identifier 420 may be implemented using a combination of hardware and software. In the present disclosure, operations described as being performed by the BB identifier 420 may include operations that the BB identifier 420 may direct a system to perform.

In some embodiments, the BB identifier 420 may be configured to determine the correspondence between the comparison BB 422 and the vulnerable BB 442 based on instructions that may be substantially the same or identical in the comparison BB 422 and the vulnerable BB 442. For example, in some embodiments, the BB identifier 420 may be configured to determine a degree of correspondence between the comparison BB 422 and the vulnerable BB 442 based on a number of instructions that may be identical between the comparison BB 422 and the vulnerable BB 442. Additionally or alternatively, the degree of correspondence may be based on a number of consecutive identical instructions between the comparison BB 422 and the vulnerable BB 442. In these or other embodiments, the BB identifier 420 may be configured to determine the similarity index value 482 based on the determined degree of correspondence.

For example, in some embodiments the BB identifier 420 may include an instruction scorer 410 which may include code and routines configured to enable a computing system to perform one or more operations to determine a correspondence between different basic blocks based on the instructions of the basic blocks. Additionally or alternatively, the instruction scorer 410 may be implemented using hardware including a processor, a microprocessor (e.g., to perform or control performance of one or more operations), a field-programmable gate array (FPGA), or an application-specific integrated circuit (ASIC). In some other instances, the instruction scorer 410 may be implemented using a combination of hardware and software. In the present disclosure, operations described as being performed by the instruction scorer 410 may include operations that the instruction scorer 410 may direct a system to perform.

In some embodiments, the instruction scorer 410 may be configured to compare instructions of basic blocks to determine a correspondence and associated indication of a degree of similarity between the basic blocks that may be compared. For example, the instruction scorer 410 may be configured to compare the comparison BB 422 with the vulnerable BB 442 to generate an instruction score 432 that may be based on a degree of correspondence between the instructions of the comparison BB 422 and the vulnerable BB 442. As such, the instruction score 432 may indicate a degree of similarity between the comparison BB 422 and the vulnerable BB 442.

In some embodiments, the instruction scorer 410 may be configured to determine which instructions of the comparison BB 422 may be identical to those included in the vulnerable BB 442 based on the comparison. Additionally or alternatively, the instruction score 432 may be based on a number of instructions that may be identical between the comparison BB 422 and the vulnerable BB 442. For example, the instruction score 432 may be a count of instructions that may be identical between the comparison BB 422 and the vulnerable BB 442. In these or other embodiments, the instruction score 432 may be a count of consecutive identical instructions between the comparison BB 422 and the vulnerable BB 442. In these or other embodiments, the instruction score 432 may be a greatest common n-gram of identical instructions score, or a GCII score, that may be a count or other representation of the length of n-grams of identical instructions shared between the BBs being compared by the instruction scorer 410.

In some embodiments, the instruction scorer 410 may count the length of n-grams of identical instructions between the comparison BB 422 and the vulnerable BB 442. The length of n-gram of identical instructions may be the number of consecutive identical instructions in the longest group of consecutive identical instructions common to both BBs. The instruction scorer 410 may compare more than one instruction of the comparison BB 422 with more than one instruction of the vulnerable BB 442, individually, and then severally. For example, the instruction scorer 410 may compare each instruction of two BBs to determine how many instructions are identical between the two BBs. In some embodiments, the instruction scorer 410 may determine the number of consecutive instructions in the longest group of consecutive identical instructions shared by the BBs, this may be used as the instruction score 432. Additionally or alternatively the instruction scorer 410 may simply count the total number of identical instructions shared by the two BBs, this may be used as the instruction score 432.

By way of example, the comparison BB 422 and the vulnerable BB 442 may include instructions as illustrated below in Table 1.

TABLE 1

| Example instructions of the Comparison BB 422 | Example instructions of the vulnerable BB 442 |
| --- | --- |
| 1) read a first value from a first memory location, | 1) read a first value from the fourth memory location |
| 2) read a second value from a second memory location, | 2) read a second value from the second memory location |
| 3) multiply the first value by the second value, | 3) multiply the first value by the second value |
| 4) store the result of the multiplication in a third memory location, | 4) store the result of the multiplication in the third memory location |
| 5) read a third value from a fourth memory location | 5) add the first value to the result |
| 6) if the third value is greater than the second value | 6) if the result is greater than the second value |
| 7) then jump to a second BB | 7) then jump to a second BB |

In the above example, instructions 2, 3, 4, and 7 in the comparison BB 422 and the vulnerable BB 442 are the same. As indicated above, in some embodiments, the instruction score 432 may be based on the number of consecutive identical instructions in the longest group of consecutive identical instructions. Therefore, with respect to this example, in some embodiments, the instruction score 432 may be three, representing the three consecutive identical instructions, for example instructions 2, 3, and 4. Additionally or alternatively the instruction score 432 may be based on the total number of identical instructions without regard for position. For instance, with respect to this example, the instruction score 432 may be four, representing the four identical instructions, for example, instructions 2, 3, 4, and 7.

In some embodiments, the BB identifier 420 may be configured to determine the correspondence between the comparison BB 422 and the vulnerable BB 442 based on the categories of instructions that may be the same or identical in the comparison BB 422 and the vulnerable BB 442. For example, the BB identifier 420 may be configured to determine a degree of correspondence between the comparison BB 422 and the vulnerable BB 442 based on a number of categories of instructions that may be the same between the comparison BB 422 and the vulnerable BB 442. Additionally or alternatively the degree of correspondence may be based on a number of consecutive identical categories of instructions between the comparison BB 422 and the vulnerable BB 442. In these or other embodiments, the BB identifier 420 may be configured to determine the similarity index value 482 based on the degree of correspondence.

For example, in some embodiments the BB identifier 420 may include a category scorer 450 which may include code and routines configured to enable a computing system to perform one or more operations to compare instructions of two or more BBs. Additionally or alternatively, the category scorer 450 may be implemented using hardware including a processor, a microprocessor (e.g., to perform or control performance of one or more operations), a field-programmable gate array (FPGA), or an application-specific integrated circuit (ASIC). In some other instances, the category scorer 450 may be implemented using a combination of hardware and software. In the present disclosure, operations described as being performed by the category scorer 450 may include operations that the category scorer 450 may direct a system to perform.

In some embodiments the category scorer 450 may be configured to compare categories of instructions of basic blocks to determine a correspondence and associated indication of a degree of similarity between the basic blocks that may be compared. For example, the category scorer 450 may compare the comparison BB 422 with the vulnerable BB 442 and generate a category score 472 that may be based on a degree of correspondence between the instructions of the comparison BB 422 and the vulnerable BB 442. As such, the category score 472 may be indicate a degree of similarity between the comparison BB 422 and the vulnerable BB 442.

In some embodiments the category scorer 450 may include an instruction category identifier 460 which may include code and routines configured to enable a computing system to perform one or more operations to identify categories corresponding to instructions of BBs. Additionally or alternatively, the instruction category identifier 460 may be implemented using hardware including a processor, a microprocessor (e.g., to perform or control performance of one or more operations), a field-programmable gate array (FPGA), or an application-specific integrated circuit (ASIC). In some other instances, the instruction category identifier 460 may be implemented using a combination of hardware and software. In the present disclosure, operations described as being performed by the instruction category identifier 460 may include operations that the instruction category identifier 460 may direct a system to perform.

In some embodiments the instruction category identifier 460 may categorize one or more instructions of a BB into one or more categories. In some embodiments the instruction category identifier 460 may categorize instructions of the comparison BB 422 into a list of comparison basic block instructions by category (comparison BB instructions by category 462). Additionally, the instruction category identifier 460 may categorize instructions of the vulnerable BB 442 into a list vulnerable basic block instructions by category (vulnerable BB instructions by category 464). The instruction category identifier 460 may categorize each instruction of the comparison BB 422 and the vulnerable BB 442 into one or more categories each. The categories of instructions into which the instructions may be categorized may include: load/store, arithmetic, logic, bit manipulation, control flow, interrupts, and tests. The instruction category identifier 460 may be configured to categorize the instructions of the BBs using any suitable technique for categorizing instructions. For example an entire opcode set, such as, for example, the x86 opcode set, the Microprocessor without Interlocked Pipeline Stages (MIPS) instruction set, and/or the Acorn Reduced Instruction Set Computer (RISC) Machine (ARM) instruction set, may be mapped into categories.

By way of example, the comparison BB 422 may include instructions illustrated below in Table 2. The instructions may be categorized into categories as illustrated in Table 2.

TABLE 2

| Example instructions of the comparison BB 422 | Example categorized instructions of the BB |
|---|---|
| 1) read a first value from a first memory location, | 1) store/load |
| 2) read a second value from a second memory location, | 2) store/load |
| 3) multiply the first value by the second value, | 3) arithmetic |
| 4) store the result of the multiplication in a third memory location, | 4) store/load |
| 5) read a third value from a fourth memory location | 5) store/load |
| 6) if the third value is greater than the second value | 6) test |
| 7) then jump to a second BB | 7) control flow |

In the above example, each of the example instructions of the comparison BB 422 are categorized into a category.

In some embodiments the category scorer 450 may include a categorized instruction scorer 470 which may include code and routines configured to enable a computing system to perform one or more operations to compare categorized instructions of two or more BBs. Additionally or alternatively, the categorized instruction scorer 470 may be implemented using hardware including a processor, a microprocessor (e.g., to perform or control performance of one or more operations), a field-programmable gate array (FPGA), or an application-specific integrated circuit (ASIC). In some other instances, the categorized instruction scorer 470 may be implemented using a combination of hardware and software. In the present disclosure, operations described as being performed by the categorized instruction scorer 470 may include operations that the categorized instruction scorer 470 may direct a system to perform.

In some embodiments, the categorized instruction scorer 470 may be configured to compare categories of instructions of basic blocks to determine a correspondence and associated indication of a degree of similarity between the basic blocks that may be compared. For example, the categorized instruction scorer 470 may be configured to compare the comparison BB 422 with the vulnerable BB 442 to generate a category score 472 that may be based on a degree of correspondence between the instructions of the comparison BB 422 and the vulnerable BB 442. Additionally or alternatively the categorized instruction scorer 470 may compare the comparison BB instructions by category 462 and the vulnerable BB instructions by category 464 to generate a category score 472 that may be based on a degree of correspondence between the instructions of the comparison BB 422 and the vulnerable BB 442. As such, the category score 472 may indicate a degree of similarity between the comparison BB 422 and the vulnerable BB 442.

In some embodiments, the categorized instruction scorer 470 may be configured to determine which instructions of the comparison BB 422 may be of the same category as those included in the vulnerable BB 442 based on the comparison. In some embodiments, the categorized instruction scorer 470 may compare the comparison BB instructions by category 462 with vulnerable BB instructions by category 464 to determine which instructions are of the same category. Additionally or alternatively, the category score 472 may be based on a number of instructions that may be of the same category between the comparison BB 422 and the vulnerable BB 442. For example, the category score 472 may be a count of instructions that may of the same category between the comparison BB instructions by category 462 and the vulnerable BB instructions by category 464. In these or other embodiments, the category score 472 may be a count of consecutive instructions of the same category between the comparison BB instructions by category 462 and the vulnerable BB instructions by category 464. In some embodiments the categorized instruction scorer 470 may compare the comparison BB instructions by category 462 with the vulnerable BB instructions by category 464 to determine the count of consecutive instructions of the same category between the comparison BB 422 and the vulnerable BB 442. In these or other embodiments, the category score 472 may be a greatest common n-gram of categorized instructions score, or a GCCI score, that may be a count or other representation of the length of n-grams of categorized instructions shared between the BBs being compared by the categorized instruction scorer 470. The length of n-grams of identical categories of instructions may be the number of consecutive identical categories of instructions in the longest consecutive group of identical categories of identical instructions common to both BBs.

In some embodiments, the categorized instruction scorer 470 may count the length of n-grams of identical categories of instructions between the comparison BB instructions by category 462 and the vulnerable BB instructions by category 464. The categorized instruction scorer 470 may compare the category of more than one instruction of the comparison BB instructions by category 462 with the category of more than one instruction of the vulnerable BB instructions by category 464, individually, and then severally. For example, the categorized instruction scorer 470 may compare comparison BB instructions by category 462 and the vulnerable BB instructions by category 464 to determine how many instructions are of the same category between the two BBs. In some embodiments, the categorized instruction scorer 470 may find the length of the longest group of consecutive identical instructions shared by the BBs, this may be the category score 472. Additionally or alternatively the categorized instruction scorer 470 may simply count the total number of identical categories of instructions shared by the two BBs, this may be the category score 472.

By way of example, the comparison BB 422 and the vulnerable BB 442 may include instructions as illustrated below in Table 3.

TABLE 3

| Example instructions of the comparison BB 422 | Example comparison BB instructions by category 462 | Example instructions of the vulnerable BB 442 | Example vulnerable BB instructions by category 464 |
| --- | --- | --- | --- |
| 1) read a first value from a first memory location, | 1) store/load | 1) read a first value from the fourth memory location | 1) store/load |
| 2) read a second value from a second memory location, | 2) store/load | 2) read a second value from the second memory location | 2) store/load |
| 3) multiply the first value by the second value, | 3) arithmetic | 3) multiply the first value by the second value | 3) arithmetic |
| 4) store the result of the multiplication in a third memory location, | 4) store/load | 4) store the result of the multiplication in the third memory location | 4) store/load |
| 5) read a third value from a fourth memory location | 5) store/load | 5) add the first value to the result | 5) arithmetic |
| 6) if the third value is greater than the second value | 6) test | 6) if the result is greater than the second value | 6) test |
| 7) then jump to a second BB | 7) control flow | 7) then jump to a second BB | 7) control flow |

Table 3 illustrates example instructions and categorized instructions of two basic blocks. For illustration differences between instructions, and the categorized instructions have been emphasized.

In the above example, the categories of instructions 1, 2, 3, 4, 6, and 7 in the example comparison BB 422 and the example vulnerable BB 442 are the same. As indicated above, in some embodiments, the category score 472 may be based on the number of consecutive identical categories of instructions in the longest consecutive group of identical instructions. Therefore, with respect to this example, in some embodiments, the category score 472 may be four representing the four consecutive identical categories of instructions, for example, 1, 2, 3, and 4. Additionally or alternatively the category score 472 may be four representing the total of four categories that both sets of categorized instructions include, for example, store/load, arithmetic, logic, and control flow.

In some embodiments the BB identifier 420 may include a score combiner 480 which may include code and routines configured to enable a computing system to perform one or more operations to combine scores from two or more sources. Additionally or alternatively, the score combiner 480 may be implemented using hardware including a processor, a microprocessor (e.g., to perform or control performance of one or more operations), a field-programmable gate array (FPGA), or an application-specific integrated circuit (ASIC). In some other instances, the score combiner 480 may be implemented using a combination of hardware and software. In the present disclosure, operations described as being performed by the score combiner 480 may include operations that the score combiner 480 may direct a system to perform.

In some embodiments the score combiner 480 may combine the instruction score 432 with the category score 472 to generate the similarity index value 482. For example, in some embodiments, the score combiner 480 may generate an average, or weighted average of the instruction score 432 and the category score 472. For example, in some embodiments, because the categorized instructions are more general than the instructions themselves, the instruction score 432 may be more indicative of similarity than the category score 472. As such, in some instances, the score combiner 480 may weight the instruction score 432 more heavily when establishing a weighted average for the similarity index value 482. The score combiner 480 may perform the weighting according to any suitable weighting scheme.

Additionally or alternatively the score combiner 480 may generate one or more similarity index values 482 based on different weighting schemes. Additionally or alternatively, the score combiner 480 may be run iteratively to update the weighting scheme. For example, the BB identifier 420 may be run on a group of comparison BBs 422 and a single vulnerable BB 442, the vulnerable BB 442 may be a training BB designed to train the BB identifier 420 to recognize correspondence. After running the BB identifier 420 on the group of comparison BB 422 and the vulnerable BB 442, the BB identifier 420 may determine that the resulting similarity index values 482 were not high enough in comparison to a threshold. The score combiner 480 may adjust the weighting scheme to weight, the category score 472 more heavily.

Additionally or alternatively, in some embodiments determining similarity between BBs may be based on commonality of operation, function, or implementation. Commonality of operation, function or implementation may be described as semantic similarity. For example a particular BB may be identified as being related to a "string compare" functionality. For example the particular BB may be part of a higher level function that performs a string comparison. Other BBs also related to "string compare" may be determined to be similar to the particular BB. The semantic similarity may occur independent of the operation of the instruction scorer 410 and the category scorer 450. So, for example, the comparison BB 422 may be similar to the vulnerable BB 442 based on the semantic similarity even if the instruction score 432 and the category score 472 are low.

The similarity index value 482 may provide an indication of the correspondence between the comparison BB 422 and the vulnerable BB 442 and the associated degree of similarity. The similarity index value 482 may indicate whether the comparison BB 422 may be identified as a potentially vulnerable location. In some embodiments, the similarity index value 482 may indicate whether the comparison BB 422 may be identified as a target BB 122 of FIG. 1 and whether further testing with regard to the comparison BB 422 may be undertaken. Additionally or alternatively, the similarity index value 482 may be included in a similarity index that may include multiple similarity index values that may each be determined based on different comparisons.

In some embodiments, the BB identifier 420 may identify the comparison BB 422 as a potentially vulnerable location. Additionally or alternatively, the BB identifier 420 may identify the comparison BB 422 as the target BB 122 of FIG. 1 based on the comparison BB 422 being identified as a potentially vulnerable location. The identifications made by the BB identifier 420 may be based on the similarity index value 482 similar or analogous to identification of the target BB 122 described above with respect to FIG. 1.

Modifications, additions, or omissions may be made to the BB identifier 420 without departing from the scope of the present disclosure. For example, in some embodiments the instruction scorer 410, the category scorer 450, or the score combiner 480 may be omitted. In these or other embodiments the similarity index value 482 may be based only on one or the other of the instruction score 432, the category score 472, or some other indication of correspondence between the BBs based on common instructions or another measure of similarity, such as, for example semantic similarity. Further, the order of operations may vary according to different implementations. Additionally or alternatively, the scoring based on common instructions or common categories may be different than as described.

Figure 5:
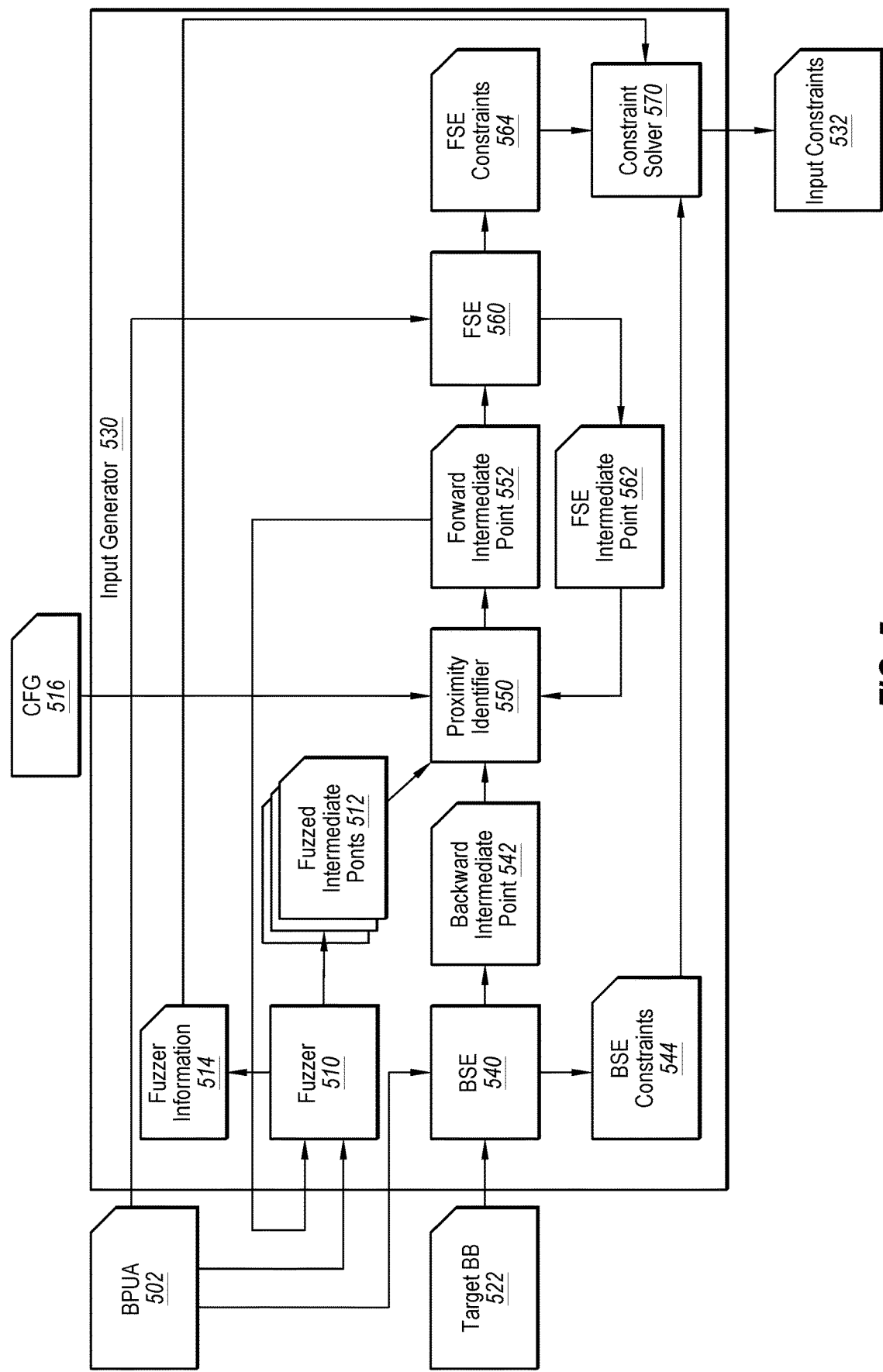
FIG. 5 is a block diagram of an example environment configured to identify input constraints of a binary program with respect to the location of a target basic block.

FIG. 5 is a block diagram of an example input generator 530 configured to identify input constraints of a binary program with respect to encountering a target basic block based on the input constraints, arranged in accordance with at least one embodiment described in this disclosure. The input generator 530 may perform operations related to automated testing techniques; for example, the input generator 530 may include a fuzzer 510, a backward symbolic executor 540 (BSE 540) and/or a forward symbolic executor 560 (FSE 560) that may each be configured to perform one or more operations related to automated testing techniques. The input generator 530 may also include a proximity identifier 550 and a constraint solver 570. The input generator 530 may generate input constraints 532 with respect to a target basic block 522 (target BB 522) for a binary program under analysis 502 (BPUA 502). The input generator 530 may also use a control flow graph 516 (CFG 516). The input generator 530 may be analogous to the input generator 130 of FIG. 1. The target BB 522 may be analogous to the target BB 122 of FIG. 1. The BPUA 502 may be analogous to the BPUA 102 of FIG. 1. The CFG 516 may be analogous to the CFG 116 of FIG. 1. The input constraints 532 may be analogous to the input constraints 132 of FIG. 1.

In some embodiments the input generator 530 may include code and routines configured to enable a computing system to perform one or more operations to identify inputs for a binary program with respect to a target BB. Additionally or alternatively, the input generator 530 may be implemented using hardware including a processor, a microprocessor (e.g., to perform or control performance of one or more operations), a field-programmable gate array (FPGA), or an application-specific integrated circuit (ASIC). In some other instances, the input generator 530 may be implemented using a combination of hardware and software. In the present disclosure, operations described as being performed by the input generator 530 may include operations that the input generator 530 may direct a system to perform.

The input generator 530 may be configured to create or attempt to create inputs and/or constraints that may lead from a starting point of the BPUA 502 to the target BB 522. In the present disclosure the starting point of the BPUA 502 may include any point in the BPUA 502 where it may be known how to reach that point during an execution. For example, the starting point may include an initialization point of the BPUA 502 or any other subsequent points in which it may be known how to reach the subsequent points from the initialization point. The inputs and constraints that may lead to a starting point of the BPUA 502 may be included in the input constraints 532. As indicated below, the input constraints 532 may be determined using the fuzzer 510, the BSE 540, and/or the FSE 560.

In some embodiments, the input generator 530 may include the fuzzer 510 which may include code and routines configured to enable a computing system to perform one or more operations to execute a binary program. Additionally or alternatively, the fuzzer 510 may be implemented using hardware including a processor, a microprocessor (e.g., to perform or control performance of one or more operations), a field-programmable gate array (FPGA), or an application-specific integrated circuit (ASIC). In some other instances, the fuzzer 510 may be implemented using a combination of hardware and software. In the present disclosure, operations described as being performed by the fuzzer 510 may include operations that the fuzzer 510 may direct a system to perform.

In some embodiments the fuzzer 510 may execute a binary program repeatedly, using random inputs. For example, the fuzzer 510 may execute the BPUA 502 repeatedly, using random inputs. For example the fuzzer 510 may be configured to execute the BPUA 502, beginning from the starting point each time an execution ends, and with one or more different inputs each time. The fuzzer 510 may execute the BPUA 502 using random inputs, pseudo-random inputs, inputs derived from other inputs, inputs based on input seeds, concrete inputs, inputs based on constraints, or other inputs. The fuzzer 510 may have an input queue including inputs for the fuzzer 510 to use in executing the BPUA 502. The fuzzer 510 may be a branch-coverage based fuzzer. The fuzzer 510 may provide precise information on which branches of the BPUA 502 were covered during a single execution, and/or over the course of more than one execution. The information relating to branches reached during execution may be stored in fuzzed intermediate points 512, and fuzzer information 514.

In some embodiments, the fuzzer 510 may run as part of input generator 530, additionally or alternatively, the fuzzer 510 may run as part of the test executor 190 of FIG. 1. As such, the fuzzer 510 may identify irregularities in execution, such as, for example, hangs, crashes, failures or other unexpected or undesirable behavior or vulnerabilities. The fuzzer 510 may run concurrently with any or all of the steps or processes of the input generator 530, environment 100 of FIG. 1, or any other process disclosed herein. For example, the fuzzer 510 may be executing the BPUA 502 to test the BPUA 502 while the input generator 530 is generating inputs for the input queue of the fuzzer 510.

The fuzzer 510 may generate the fuzzed intermediate points 512. The fuzzed intermediate points 512 may include a listing of all basic blocks or points in the binary program that have been reached by the fuzzer 510.

The fuzzer 510 may generate the fuzzer information 514. The fuzzer information 514 may include inputs or constraints with respect to the fuzzed intermediate points 512. For example, the fuzzer information 514 may enable a subsequent execution of the BPUA 502 to reach the same basic block, or point within the BPUA 502 reached by the fuzzer 510 and stored in the fuzzed intermediate points 512, by using the inputs or constraints stored in the fuzzer information 514. The fuzzer 510 may run based on the fuzzer information 514 in order to explore new branches of the BPUA 502. For example, the fuzzer 510 may execute the BPUA 502 and store fuzzed intermediate points 512 and fuzzer information 514. The fuzzer 510 may be subsequently guided to any of the fuzzed intermediate points 512 by giving the fuzzer 510 the fuzzer information 514 relative to the fuzzed intermediate points 512. In some instances, the fuzzer 510 may encounter the target BB 522 during its fuzzing operations. In these or other instances, the target BB 522 may be included in the fuzzed intermediate points 512 and the inputs and constraints that lead to the target BB 522 may be included in the fuzzer information 514. As such, in some instances, the fuzzer information 514 that may be associated with the target BB 522, as included in the fuzzed intermediate points 512 may be used as the input constraints 532.

In some embodiments, the input generator 530 may include the BSE 540 which may include code and routines configured to enable a computing system to perform one or more operations to execute a binary program backward starting from a basic block or point in the binary program. Additionally or alternatively, the BSE 540 may be implemented using hardware including a processor, a microprocessor (e.g., to perform or control performance of one or more operations), a field-programmable gate array (FPGA), or an application-specific integrated circuit (ASIC). In some other instances, the BSE 540 may be implemented using a combination of hardware and software. In the present disclosure, operations described as being performed by the BSE 540 may include operations that the BSE 540 may direct a system to perform.

In some embodiments the BSE 540 may execute the BPUA 502 backward from the target BB 522 and working toward a starting point of the BPUA 502. The BSE 540 may perform backward symbolic execution of the BPUA 502 in doing so. For example, during execution, the BSE 540 may identify constraints relating to the execution of the BPUA 502, the constraints may be stored as backward symbolic execution constraints 544 (BSE constraints 544). The BSE 540 may further identify basic blocks or points in the BPUA 502 reached during execution, the basic blocks or points reached in the BPUA 502 may be stored as part of the BSE constraints 544.

Backward execution by the BSE 540 may reach the starting point of the BPUA 502. If this occurs, the BSE constraints 544 may include inputs, and/or constraints with respect to the target BB 522. At this point the BSE constraints 544 may be identified as the input constraints 532. In other words, if the BSE 540 is able to work backward from the target BB 522 to the starting point of the BPUA 502, the BSE constraints 544 may be identified as input constraints 532 because the BSE constraints 544 include inputs and/or constraints sufficient to guide execution of the BPUA 502 from the starting point, to the target BB 522.

Additionally or alternatively, the constraint solver 570 may solve, and/or otherwise refine the BSE constraints 544 to identify the input constraints 532 such that the input constraints 532 may be based on the BSE constraints 544 in a less direct manner. As a result, the input constraints 532 may be used in further test execution to test the target BB 522. For example, the test executor 190 of FIG. 1 may then test the BPUA 502 using the input constraints 532, which may be analogous to the input constraints 132. Additionally or alternatively, the fuzzer 510 may be used to test the BPUA 502 using the input constraints 532 that may be derived from the BSE constraints 544.

In some instances, as the BSE 540 executes the BPUA 502 backward from the target BB 522 toward the starting point of the BPUA 502, the BSE 540 may stop at a backward intermediate point 542. In some embodiments, the BSE 540 may stop as a result of a crash or stall in the BSE 540. Additionally or alternatively, the BSE 540 may stop after a particular amount of time of backward symbolic execution based on a timeout constraint. Additionally or alternatively, the BSE 540 may be configured to stop after the BSE constraints 544 grow to a size or complexity such that they cross a threshold of size or complexity.

When the BSE 540 stops, the point at which the BSE 540 stopped may be identified as the backward intermediate point 542. Additionally or alternatively, the backward intermediate point 542 may be the point in the BPUA 502 reached during backward execution by the BSE 540 that is farthest, as measured by distance in the CFG 516, from the target BB 522. Additionally or alternatively the backward intermediate point 542 may be the point in the BPUA 502 reached during backward execution by the BSE 540 that is closest, as measured by distance in the CFG 516, to the starting point of the BPUA 502. Additionally or alternatively, the backward intermediate point 542 may be a point that is within a threshold distance, as measured by distance in the CFG 516, from the target BB 522. The BSE 540 may execute the BPUA 502 multiple times and reach different points. The backward intermediate point 542 may be updated over time.

The BSE 540 may generate the BSE constraints 544. The BSE constraints 544 may include the constraints and/or inputs relative to the backward intermediate point 542. The BSE constraints 544 may be sufficient to guide execution of the BPUA 502 from the backward intermediate point 542 to the target BB 522. Additionally or alternatively, the BSE constraints 544 may be sufficient to guide backward execution of the BPUA 502 from the target BB 522 to the backward intermediate point 542.

With regard to backward execution, the BSE 540, the backward intermediate point 542, and the BSE constraints 544 it may be that the constraints may be similar or translatable between backward and forward execution. For example, having BSE constraints 544 relative to a backward intermediate point 542 and a target BB 522 may be equivalent to having both constraints that may guide a forward execution from the backward intermediate point 542 to the target BB 522, and constraints that may guide a backward execution from the target BB 522 to the backward intermediate point 542.

Additionally, in the case that the BSE 540 works backward but does not reach the starting point of the BPUA 502, the BSE constraints 544 may include the inputs and/or constraints that may lead backward from the target BB 522 to the backward intermediate point 542, but no farther. So, the inputs and/or constraints that may lead from the starting point of the BPUA 502 to the target BB 522 may not be completely known solely based on the BSE constraints 544. In some embodiments in instances in which the BSE 540 is unable to reach the starting point of the BPUA 502, but instead stops at the backward intermediate point 542, the input generator 530 may use automated testing techniques, such as for example, forward symbolic execution, and/or fuzzing, to try to complete an execution from the starting point of the BPUA 502 to the backward intermediate point 542. In some embodiments, the BSE 540 may perform the automated testing based on a distance between the backward intermediate point 542 and another point in the BPUA 502 for which the inputs and/or constraints are already known Distance may be a measure of how many jumps, or transitions between BBs, occur between one BB and another BB. Distance may be measured and/or observed in a CFG, for example, CFG 516. In some embodiments, the input generator 530 may include the proximity identifier 550 which may include code and routines configured to enable a computing system to perform one or more operations to measure distance, as measured by distance on a CFG, between two or more BBs of a binary program. Additionally or alternatively, the proximity identifier 550 may be implemented using hardware including a processor, a microprocessor (e.g., to perform or control performance of one or more operations), a field-programmable gate array (FPGA), or an application-specific integrated circuit (ASIC). In some other instances, the proximity identifier 550 may be implemented using a combination of hardware and software. In the present disclosure, operations described as being performed by the proximity identifier 550 may include operations that the proximity identifier 550 may direct a system to perform.

In some embodiments the proximity identifier 550 may compare the distance, as measured by the CFG 516, between the two or more points in the BPUA 502. For example, the proximity identifier 550 may compare the distance between the one or more of the fuzzed intermediate points 512 and the backward intermediate point 542. The point of the fuzzed intermediate points 512 that is closest, as measured by distance in the CFG 516, to the backward intermediate point 542 may be identified as a forward intermediate point 552. Additionally or alternatively the proximity identifier 550 may identify one or more points that are within a threshold distance, as measured by distance in the CFG 516, from the backward intermediate point 542 as the forward intermediate point 552.

Because the fuzzer 510 and the BSE 540 may be executing the BPUA 502 concurrently, and may generate new fuzzed intermediate points 512, and/or a new backward intermediate point 542, the proximity identifier 550 may compare the distance between any of these points as they are generated. The proximity identifier 550 may be configured to identify the forward intermediate point 552 from the fuzzed intermediate points 512 such that the distance, as measured by the CFG 516, between the forward intermediate point 552 and the backward intermediate point 542 is reduced.

The fuzzer 510 may reach or may have previously reached the backward intermediate point 542. If the fuzzer 510 has reached the backward intermediate point 542, then the BSE constraints 544 and the fuzzer information 514, include sufficient inputs and/or constraints necessary to guide an execution of the BPUA 502 from the starting point to the target BB 522. In other words, if the fuzzed intermediate points 512 include the backward intermediate point 542, then the fuzzer information 514 and the BSE constraints 544 may be sufficient to identify input constraints 532 such that an execution may reach the target BB 522 from the starting point of the BPUA 502.

If the fuzzed intermediate points 512 include the backward intermediate point 542, the constraint solver 570 may be used to solve for input constraints 532 from the fuzzer information 514 and the BSE constraints 544. The input constraints 532 may then be used in further test execution to test the target BB 522. For example, the test executor 190 of FIG. 1 may then test the BPUA 502 using the input constraints 532, which may be analogous to the input constraints 132. Additionally or alternatively, the fuzzer 510 may be used to test the BPUA 502 using the input constraints 532.

In some embodiments the fuzzer 510 may be provided with the forward intermediate point 552 and/or inputs and/or constraints corresponding to the forward intermediate point 552. The fuzzer 510 may receive and/or use the forward intermediate point 552 as an input which may be placed in the input queue. In some embodiments the fuzzer 510 may take the forward intermediate point 552 as an input seed, which may be used as a starting input value that the fuzzer 510 may use to start fuzzing. Additionally or alternatively, the fuzzer 510 may execute the BPUA 502 based on inputs derived from the forward intermediate point 552.

In some embodiments, the input generator 530 may include the FSE 560 which may include code and routines configured to enable a computing system to perform one or more operations to perform forward symbolic execution of a binary program. Additionally or alternatively, the FSE 560 may be implemented using hardware including a processor, a microprocessor (e.g., to perform or control performance of one or more operations), a field-programmable gate array (FPGA), or an application-specific integrated circuit (ASIC). In some other instances, the FSE 560 may be implemented using a combination of hardware and software. In the present disclosure, operations described as being performed by the FSE 560 may include operations that the FSE 560 may direct a system to perform.

In some embodiments the FSE 560 may execute the BPUA 502 forward from the forward intermediate point 552. In some embodiments the FSE 560 may be provided with the objective of reaching the backward intermediate point 542. Additionally or alternatively the FSE 560 may execute the BPUA 502 from the starting point of the BPUA 502 forward, based on the forward intermediate point 552 and the fuzzer information 514, which may include inputs and/or constraints identified by execution of the BPUA 502. For example, the FSE 560 may execute the BPUA 502 from the starting point using inputs and/or constraints identified by the fuzzer 510 and stored in the fuzzer information 514, to reach the forward intermediate point 552. After the FSE 560 reaches the forward intermediate point 552, the FSE 560 may symbolically execute the BPUA 502 repeatedly attempting to reach the backward intermediate point 542. Additionally or alternatively the FSE 560 may attempt to reach the target BB 522.

The FSE 560 may identify an intermediate point reached during execution of the BPUA 502. For example, the FSE 560 may identify the intermediate point between the forward intermediate point 552 and the backward intermediate point 542. The FSE 560 may store the point reached during execution as a forward symbolic execution intermediate point 562 (FSE intermediate point 562).

The FSE 560 may identify constraints relating to the execution of the BPUA 502, the constraints may be stored as forward symbolic execution constraints 564 (FSE constraints 564). The FSE 560 may identify inputs and/or constraints related to the basic blocks or points in the BPUA 502 reached during execution. The inputs and/or constraints relating to the basic blocks or points reached in the BPUA 502 may be stored as part of the FSE constraints 564. The FSE constraints 564 may relate to the FSE intermediate point 562.

In some embodiments, the proximity identifier 550 may compare the distance, as measured by the CFG 516, between the backward intermediate point 542 and the FSE intermediate point 562 with the distance between the backward intermediate point 542 and the forward intermediate point 552. If the FSE intermediate point 562 is closer to the backward intermediate point 542 than the forward intermediate point 552, the FSE intermediate point 562 may be identified as the new forward intermediate point 552. Because the fuzzer 510, the BSE 540, and/or the FSE 560 may be executing the BPUA 502 concurrently, and may generate new fuzzed intermediate points 512, a new backward intermediate point 542, and/or a new FSE intermediate point 562 the proximity identifier 550 may compare the distance between any of these points as they are generated.

The FSE 560 may reach the backward intermediate point 542. If the FSE 560 has reached the backward intermediate point 542, then the BSE constraints 544, the fuzzer information 514, and/or the FSE constraints 564 may include sufficient inputs and/or constraints necessary to guide an execution of the BPUA 502 from the starting point to the target BB 522. For example, if the fuzzer information 514 include inputs and/or constraints to reach the forward intermediate point 552 from the starting point of the BPUA 502, and the FSE constraints 564 include inputs and/or constraints to reach the backward intermediate point 542 from the forward intermediate point 552, and the BSE constraints 544 include inputs and/or constraints to reach the target BB 522 from the backward intermediate point 542, then the fuzzer information 514, the FSE constraints 564, and the BSE constraints 544 include sufficient information to generate inputs to reach the target BB 522 from the starting point of the BPUA 502.

If the FSE 560 is able to reach the backward intermediate point 542, the constraint solver 570 may be used to solve for input constraints 532 from the fuzzer information 514, the FSE constraints 564, and the BSE constraints 544. The input constraints 532 may then be used in further test execution to test the target BB 522. For example, the test executor 190 of FIG. 1 may then test the BPUA 502 using the input constraints 532, which may be analogous to the input constraints 132. Additionally or alternatively, the fuzzer 510 may be used to test the BPUA 502 using the input constraints 532.

In some embodiments, the input generator 530 may include the constraint solver 570 which may include code and routines configured to enable a computing system to perform one or more operations to combine, solve, or refine inputs and/or constraints. Additionally or alternatively, the constraint solver 570 may be implemented using hardware including a processor, a microprocessor (e.g., to perform or control performance of one or more operations), a field-programmable gate array (FPGA), or an application-specific integrated circuit (ASIC). In some other instances, the constraint solver 570 may be implemented using a combination of hardware and software. In the present disclosure, operations described as being performed by the constraint solver 570 may include operations that the constraint solver 570 may direct a system to perform.

In some embodiments the constraint solver 570 may operate on any or all of the fuzzer information 514, BSE constraints 544, and the FSE constraints 564 to generate the input constraints 532. The constraint solver 570 may solve, combine or otherwise refine the inputs and/or constraints of any or all of the fuzzer information 514, the BSE constraints 544, and/or the FSE constraints 564.

Modifications, additions, or omissions may be made to the input generator 530 without departing from the scope of the present disclosure. For example, in some embodiments BSE 540 may be run only once on the BPUA 502. For another example, the FSE intermediate point 562 may not be compared in the proximity identifier 550. Further, the order of operations may vary according to different implementations.

Figure 6:
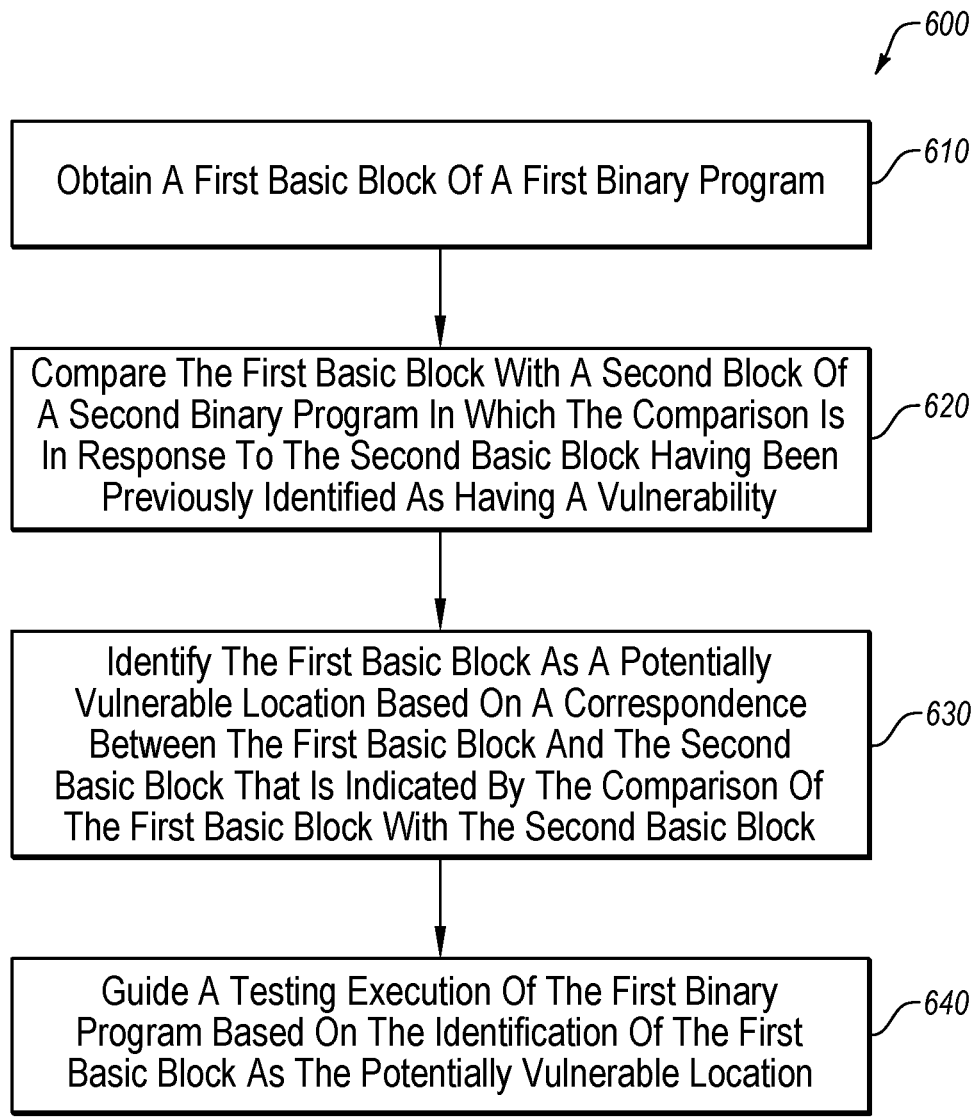
FIG. 6 is a flow chart of an example process for guiding automated testing of a binary program with respect to a potentially vulnerable location.

FIG. 6 is a flow chart of an example method 600 configured to guide automated testing of a binary program to a potentially vulnerable location, arranged in accordance with at least one embodiment described in this disclosure. In some embodiments, one or more of the operations associated with the method 600 may be performed by the BB generator 110, the BB identifier 120, the input generator 130 and/or the test executor 190 of environment 100 of FIG. 1. The method 600 may be performed by any suitable system, apparatus, or device. For example, the system 200 of FIG. 2 may perform one or more of the operations associated with the method 600. Although illustrated with discrete blocks, the steps and operations associated with one or more of the blocks of the method 600 may be divided into additional blocks, combined into fewer blocks, or eliminated, depending on the desired implementation. In general, the method

600 may identify the potentially vulnerable location in the binary program, and then guide automated testing of the binary program to the potentially vulnerable location.

The method 600 may include the block 610. At the block 610 a first basic block of a first binary program may be obtained. The first binary program may be a binary program that has been provided for testing using automated testing, for example BPUA 102 of FIG. 1. The first basic block may be obtained from any source, including the first binary program. The first basic block may be included in multiple of first-program basic blocks of the first binary program. The first basic block may be obtained as a result of a disassembler or basic block generator, such as for example the BB generator 110 of FIG. 1, disassembling the first binary program. Additionally or alternatively the first basic block may be obtained from a user, or an automated testing technique. The first basic block may be analogous to one of the basic blocks of BBs 112 of FIG. 1.

The method 600 may include the block 620. At the block 620 the first basic block may be compared with a second basic block of a second binary program. The first basic block may be the first basic block obtained in block 610.

The second basic block may have been previously identified as having a vulnerability. Additionally or alternatively, the second binary program may have been previously identified as having a vulnerability. In some embodiments the second basic block may be selected for block 620 because was previously identified as a vulnerability. The second basic block may be included in multiple basic blocks that have been previously identified as having a vulnerability. The second basic block may be analogous to one of the vulnerable BBs 142 of FIG. 1. The second basic block may be selected from a source analogous to the repository of vulnerable BBs 344 of FIG. 3. In some embodiments, the second basic block may have been identified through one or more operations analogous to those described above with respect to environment 300 of FIG. 3.

In some embodiments the second basic block may be of the first binary program. For example, if there is basic block in the first binary program that has been identified as having a vulnerability, that basic block may be used as the second basic block for subsequent testing of the first binary program.

The comparison between the first basic block and the second basic block of block 620 may include comparing instructions of the first basic block with instructions of the second basic block and generating a score indicating a degree of correspondence and thus a degree of similarity between the first basic block and the second basic block.

In some embodiments, comparing the first basic block with the second basic block may include comparing the instructions individually, or several at a time to determine whether any of the instructions are identical between the first basic block and the second basic block. The comparison may include determining a length of n-grams of identical instructions between the first basic block and the second basic block. The comparison of the instructions of the first basic block with the instructions of the second basic block may result in a score indicating a degree of correspondence and thus a degree of similarity between the first basic block and the second basic block. The comparison may include a comparison analogous to the comparison of the instruction scorer 410 of FIG. 4.

In some embodiments, comparing the first basic block with the second basic block may include comparing categories of instructions between the first basic block and the second basic block. The comparison may include identifying a category for each instruction in the first basic block; and identifying a category for each instruction in the second basic block. The comparison may then include comparing the categories of instructions of the first basic block with the categories of instructions of the second basic block. The comparison may include comparing the categories of the instructions individually, or several at a time. The comparison may include comparing the categories of the instructions to determine whether the categories of the instructions are identical. The comparison may include determining a length of n-grams of identical categories of instructions between the first basic block and the second basic block. The comparison of the categories of the instructions of the first basic block with the categories of the instructions of the second basic block may result in a score indicating a degree of correspondence and thus similarity between the first basic block and the second basic block. The comparison may include a comparison analogous to the comparison of the category scorer 450 of FIG. 4.

The comparison between the first basic block and the second basic block of block 620 may include combining one or more scores that may indicate the degree of correspondence between the first basic block and the second basic block. The scores may have been generated by one or more comparisons between the first basic block and the second basic block. The comparisons between the first basic block and the second basic block may be based on comparing instructions of the first basic block with the second basic block. The combining of the scores may result in a combined score that may indicate a correspondence between the first basic block and the second basic block.

The comparison between the first basic block and the second basic block of block 620 may be analogous to the operation of the BB identifier 120 of FIG. 1. Additionally or alternatively, the comparison between the first basic block and the second basic block of block 620 may be analogous to one or more operations described with respect to the BB identifier 420 of FIG. 4.

The method 600 may include the block 630. At the block 630 the first basic block may be identified as a potentially vulnerable location. The identification of the first basic block as the potentially vulnerable location may be based on the correspondence between the first basic block and the second basic block. The correspondence between the first basic block and the second basic block may have been identified as part of block 620.

In some instances, the first basic block may be included in multiple first-program basic blocks of the binary program, and the second basic block may be included in multiple previously identified vulnerable basic blocks. For example the first binary program may be disassembled into multiple first-program basic blocks. For example there may be one or more basic blocks that have been identified as having vulnerabilities, these may be the multiple previously identified vulnerable basic blocks. Further, in some instances, instructions of the first and second basic blocks may each have a category of instruction. The categories of instructions may include: load/store, arithmetic, logic, bit manipulation, control flow, interrupts, and tests.

In some embodiments the instructions may be compared in the order in which the instructions are found in the basic block. For example, the first basic block may have a first instruction, a second instruction and a third instruction. The second basic block may have a fourth instruction, a fifth instruction and a sixth instruction. The identification of the first basic block as the potentially vulnerable location may be based on the first instruction being identical to the fourth instruction, and the second instruction being identical to the fifth instruction, and the third instruction being identical to the sixth instruction. In these or other embodiments, the first basic block may have a first instruction, a second instruction and a third instruction. The identification of the first basic block as the potentially vulnerable location may be based on the first instruction, the second instruction and the third instruction being identical and in the same order in the first basic block and the second basic block.

In some embodiments the categories of instructions may be compared in the order in which the corresponding instructions are found in the basic block. For example, the first basic block may have a first instruction, a second instruction and a third instruction. The first instruction may be of a first category of instructions. The second instruction may be of a second category of instructions. The third instruction may be of a third category of instructions. The second basic block may have a fourth instruction, a fifth instruction and a sixth instruction. The fourth instruction may be of the first category of instructions. The fifth instruction may be of the second category of instructions. The sixth instruction may be of the third category of instructions. The identification of the first basic block as the potentially vulnerable location may be based on the first instruction having the same category of instruction as the fourth instruction, and the second instruction having the same category of instruction as the fifth instruction, and the third instruction having the same category of instruction as the sixth instruction.

Among the correspondences that may indicate that the first basic block may be identified as the potentially vulnerable location may be that the first basic block shares more common instructions with the second basic block than the first block shares with any other previously identified vulnerable basic block. For example, the first basic block may be compared with one or more basic blocks of the in multiple previously identified vulnerable basic blocks and the comparison may indicate that the first basic block is more similar to the second basic block than the first block is to any other previously identified vulnerable basic blocks (e.g., based on determined similarity index values determined between the first basic block and the previously identified vulnerable basic blocks). Additionally, the determined correspondence between the first basic block and the second basic block may be such that the first basic block may be identified as a potentially vulnerable location (e.g., based on a similarity index value associated with the first basic block and the second basic block such as described above). As such, the first basic block may be identified as the potentially vulnerable location based on the first basic block sharing more common instructions with the second basic block than the first basic block shared with any other of the previously identified vulnerable basic blocks.

Among the correspondences that may indicate that the first basic block may be identified as the potentially vulnerable location may be that the first basic block shares more common instructions with the second basic block than any other first-program basic block shares with the second block. For example, the second basic block may be compared with one or more basic blocks of the in multiple first-program basic blocks and the comparison may indicate that the first basic block is more similar to the second basic block than any other first-program basic block is with the second basic block (e.g., based on determined similarity index values determined between the multiple first-program basic blocks and the second basic block). Additionally, the determined correspondence between the first basic block and the second basic block may be such that the first basic block may be identified as a potentially vulnerable location (e.g., based on a similarity index value associated with the first basic block and the second basic block such as described above). As such, the basic block of the first-program basic blocks that has more common instructions with the second basic block than any other first-program basic block has with the second basic block may be identified as the potentially vulnerable location.

Among the correspondences that may indicate that the first basic block may be identified as the potentially vulnerable location may be that the first basic block shares at least a threshold number of common instructions with the second basic block. For example there may be a threshold of six. The first basic block may be identified as the potentially vulnerable location based on the first basic block may share six or more common instructions with the second basic block.

Among the correspondences that may indicate that the first basic block may be identified as the potentially vulnerable location may be that the first basic block shares more common instructions with the second basic block than any other first-program basic block shares with any other previously identified vulnerable basic blocks. For example one or more basic blocks of the first-program basic blocks may be compared with one or more basic blocks of the previously identified vulnerable basic blocks and the comparison may indicate that the first basic block is more similar to the second basic block than any of the other first-program basic blocks is to any other previously identified vulnerable basic blocks (e.g., based on determined similarity index values determined between the first-program basic blocks and the previously identified vulnerable basic blocks). Additionally, the determined correspondence between the first basic block and the second basic block may be such that the first basic block may be identified as a potentially vulnerable location (e.g., based on a similarity index value associated with the first basic block and the second basic block such as described above). As such, the first-program basic block that shares more common instructions with a second basic block of the previously identified vulnerable basic blocks than any of the other first-program basic blocks share with any of the previously identified vulnerable basic blocks may be identified as the potentially vulnerable location.

Among the correspondences that may indicate that the first basic block may be identified as the potentially vulnerable location may be that the first basic block shares more instructions of a same category of instructions with the second basic block than with any other previously identified vulnerable basic blocks. For example the first program basic block may be compared with one or more basic blocks of the previously identified vulnerable basic blocks and the comparison may indicate that the first basic block is more similar to the second basic block than the first block is to any other previously identified vulnerable basic blocks (e.g., based on determined similarity index values determined between the first basic block and the previously identified vulnerable basic blocks). Additionally, the determined correspondence between the first basic block and the second basic block may be such that the first basic block may be identified as a potentially vulnerable location (e.g., based on a similarity index value associated with the first basic block and the second basic block such as described above). As such the first basic block may be identified as the potentially vulnerable location based on the first basic block having more instructions of the same category with the second basic block than the first program basic block has with any other previously identified vulnerable basic block.

Among the correspondences that may indicate that the first basic block may be identified as the potentially vulnerable location may be that the first basic block shares more instructions of a same category of instructions with the second basic block than any other first-program basic block shares with the second basic block. For example the second basic block may be compared with one or more basic blocks of the first-program basic blocks and the comparison may indicate that the first basic block is more similar to the second basic block than any other first-program basic block is with the second basic block (e.g., based on determined similarity index values determined between the multiple first-program basic blocks and the second basic block). Additionally, the determined correspondence between the first basic block and the second basic block may be such that the first basic block may be identified as a potentially vulnerable location (e.g., based on a similarity index value associated with the first basic block and the second basic block such as described above). As such the first basic block may be identified as the potentially vulnerable location based on the first basic block having more instructions of the same category with the second basic block than the second basic block shares with any other first-program basic block.

Among the correspondences that may indicate that the first basic block may be identified as the potentially vulnerable location may be that the first basic block shares more instructions of a same category of instructions with the second basic block than any other first-program basic block shares with any other previously identified vulnerable basic blocks. For example one or more basic blocks of the first-program basic blocks may be compared with one or more basic blocks of the previously identified vulnerable basic blocks and the comparison may indicate that the first basic block is more similar to the second basic block than any of the other first-program basic blocks is to any other previously identified vulnerable basic blocks (e.g., based on determined similarity index values determined between the first-program basic blocks and the previously identified vulnerable basic blocks). Additionally, the determined correspondence between the first basic block and the second basic block may be such that the first basic block may be identified as a potentially vulnerable location (e.g., based on a similarity index value associated with the first basic block and the second basic block such as described above). As such the first basic block may be identified as the potentially vulnerable location based on the having more instructions of the same category with the second basic block than any of the other first-program basic blocks have with any of the other previously identified vulnerable basic blocks.

The identification of the first basic block as the potentially vulnerable location may further be based on the second basic block having been previously identified as having a vulnerability.

The identification of the first basic block as the potentially vulnerable location may include identifying the location of the first basic block in the first binary program. The identification of the first basic block as the potentially vulnerable location may include flagging, tagging, marking, labeling, noting, or otherwise identifying the first basic block as the potentially vulnerable location, and/or a target basic block.

The method 600 may include the block 640. At the block 640 a testing execution of the first binary program may be guided. The guided testing execution may be based on the identification of the first basic block as the potentially vulnerable location. The guided execution may be guided to cause the execution to execute the first basic block, which may have been identified as the potentially vulnerable location.

The guiding of the execution may include identifying inputs and/or constraints related to the first basic block. The inputs and/or constraints may allow an execution of the first binary program to execute the first basic block. If the first binary program is executed according to the inputs and/or constraints, the execution may be guided to, and caused to execute the first basic block.

The identifying inputs and/or constraints related to the first basic block may include using techniques of automatic execution to execute the first binary program. The techniques of automatic execution may include automatic execution based on random inputs, forward symbolic execution, and backward symbolic execution. The techniques of automatic execution may store inputs and/or constraints relative to the execution of the first binary program. The techniques of automatic execution may also store data relating to points reached in the first binary program. Two or more of the techniques of automatic execution may be run. The inputs and/or constraints relative to the execution of the binary program stored by the techniques of automatic execution may be combined, solved, or otherwise refined to generate inputs and/or constraints related to the first basic block. The block 640 may include steps analogous to the operation of the input generator 130 of FIG. 1. The block 640 may include steps analogous to the operation of the input generator 530 of FIG. 5.

In some embodiments the guiding of the execution may include running backward symbolic execution on the first binary program starting from a location of the first basic block, and identifying constraints of inputs of the first binary program based on the backward symbolic execution. In some instances, guiding the execution of the binary program may further include executing the binary program using the identified constraints of inputs. In some instances guiding the execution may be analogous to the operation of the input generator 530 of FIG. 5, as described above. For example, guiding the execution may involve using the BSE 540 of FIG. 5.

In some embodiments the guiding of the execution may include running backward symbolic execution on the first binary program starting from a location of the first basic block, stopping the running of backward symbolic execution at an intermediate point, running a fuzzer on the first binary program to reach the intermediate point, and identifying the constraints of inputs of the first binary program based on the running of the fuzzer to reach the intermediate point and the backward symbolic execution. In some instances, guiding the execution of the binary program may further include executing the binary program using the identified constraints of inputs. In some instances guiding the execution may be analogous to the operation of the input generator 530 of FIG. 5, as described above. For example, guiding the execution may include using the BSE 540 and/or the fuzzer 510 of FIG. 5.

In some embodiments the guiding of the execution may include running backward symbolic execution on the first binary program starting from a location of the first basic block, stopping the running of backward symbolic execution at an intermediate point, running a fuzzer on the first binary program to reach the intermediate point, identifying an other intermediate point previously encountered by the fuzzer that is within a threshold distance of the intermediate point, providing input seeds to the fuzzer to reach the intermediate point in which the input seeds are derived from inputs used by the fuzzer to previously encounter the other intermediate point, and identifying the constraints of inputs of the first binary program based on the running of the fuzzer to reach the intermediate point and the backward symbolic execution. In some instances, guiding the execution of the binary program may further include executing the binary program using the identified constraints of inputs. In some instances guiding the execution may be analogous to the operation of the input generator 530 of FIG. 5, as described above. For example, guiding the execution may include using the BSE 540 and/or the fuzzer 510 of FIG. 5.

In some embodiments the guiding of the execution may include running backward symbolic execution on the first binary program starting from a location of the first basic block, stopping the running of backward constraints symbolic execution at a first intermediate point of the first binary program, identifying a second intermediate point that is within a threshold distance of the first intermediate point, running forward symbolic execution on the binary program from the second intermediate point to the first intermediate point, and identifying the constraints of inputs of the first binary program based on the forward symbolic execution and on the backward symbolic execution. In some instances, guiding the execution of the binary program may be accomplished by executing the binary program using the identified constraints of inputs. In some instances guiding the execution may be analogous to the operation of the input generator 530 of FIG. 5, as described above. For example, guiding the execution may include using the BSE 540, the fuzzer 510, and/or the FSE 560 of FIG. 5.

The block 640 may include executing the first binary program. The execution of the first binary program may be according to the inputs and/or constraints relative to the first basic block. The execution of the first binary program may execute or reach the first basic block. The execution of the first basic block may be carried out by techniques of automatic execution, for example automatic execution based on random inputs, and/or symbolic execution. The block 640 may include steps analogous to the operation of test executor 190 of FIG. 1.

Modifications, additions, or omissions may be made to the method 600 without departing from the scope of the present disclosure. Further, the order of operations may vary according to different implementations.

One skilled in the art will appreciate that, for the environment 100, the environment 300, the BB identifier 420, the input generator 530, the method 600 and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

Further, any or all of the operations described with respect environment 100, the environment 300, the BB identifier 420, the input generator 530, the method 600 and other processes and methods disclosed herein or steps of the processes may be carried out concurrently. Some of these processes may affect the operation of other process. For example, the test executor 190 of FIG. 1 may be running throughout all operations of the environment 100, even before the input constraints 132 have been identified by the input generator 130. The test executor 190 may run initially based on random inputs. The test executor 190 may store intermediate points and inputs and/or constraints which may be sent to the input generator 130 to be included in the operation of input generator 130.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of guiding automated testing of a binary program with respect to a potentially vulnerable location, the method comprising:
   obtaining a first basic block of a first binary program;
   comparing the first basic block, with a second basic block of a second binary program in which the comparison is in response to the second basic block having been previously identified as having a vulnerability;
   identifying the first basic block as a potentially vulnerable location based on a correspondence between the first basic block and the second basic block that is indicated by the comparison of the first basic block with the second basic block; and
   guiding a testing execution of the first binary program toward testing of the first basic block to determine whether the first basic block includes one or more vulnerabilities based on the identification of the first basic block as the potentially vulnerable location, wherein it whether the first basic block includes an actual vulnerable location is unknown prior to guiding the testing execution toward testing of the first basic block and wherein the guiding of the testing execution of the first binary program includes:
      running backward symbolic execution on the first binary program starting from a location of the first basic block;
      identifying constraints of inputs of the first binary program based on the backward symbolic execution; and
      guiding the testing execution of the first binary program using the identified constraints of inputs.

2. The method of claim 1, further comprising obtaining the second basic block from a plurality of previously identified vulnerable basic blocks in which one or more of the plurality of previously identified vulnerable basic blocks is generated by:
   obtaining the second binary program;
   disassembling at least a part of the second binary program into basic blocks that include the second basic block;
   identifying a vulnerable basic block of the basic blocks that has a vulnerability; and
   including the vulnerable basic block in the repository of previously identified vulnerable basic blocks based on the vulnerable basic block being identified as having a vulnerability.

3. The method of claim 1, wherein:
   the second basic block is included in a plurality of previously identified vulnerable basic blocks; and
   the comparison of the first basic block and the second basic block indicates that the correspondence between the first basic block and the second basic block is that the first basic block shares more common instructions with the second basic block than with any other previously identified vulnerable basic block.

4. The method of claim 1, wherein:
   the first basic block is included in a plurality of first-program basic blocks of the first binary program; and
   the comparison of the first basic block and the second basic block indicates that the correspondence between the first basic block and the second basic block is that the first basic block shares more common instructions with the second basic block than any other first-program basic block shares with the second basic block.

5. The method of claim 1, wherein the comparison of the first basic block and the second basic block indicates that the correspondence between the first basic block and the second basic block is that the first basic block shares at least a threshold number of common instructions with the second basic block.

6. The method of claim 1, wherein:
the first basic block is included in a plurality of first-program basic blocks of the first binary program;
the second basic block is included in a plurality of previously identified vulnerable basic blocks; and
the comparison of the first basic block and the second basic block indicates that the correspondence between the first basic block and the second basic block is that the first basic block shares more common instructions with the second basic block than any other first-program basic block shares with any other previously identified vulnerable basic blocks.

7. The method of claim 1, wherein:
the second basic block is included in a plurality of previously identified vulnerable basic blocks; and
the comparison of the first basic block and the second basic block indicates that the correspondence between the first basic block and the second basic block is that the first basic block shares more instructions of a same category of instructions with the second basic block than with any other previously identified vulnerable basic blocks.

8. The method of claim 1, wherein:
the first basic block is included in a plurality of first-program basic blocks of the first binary program; and
the comparison of the first basic block and the second basic block indicates that the correspondence between the first basic block and the second basic block is that the first basic block shares more instructions of a same category of instructions with the second basic block than any other first-program basic block shares with the second basic block.

9. The method of claim 1, wherein:
the first basic block is included in a plurality of first-program basic blocks of the first binary program;
the second basic block is included in a plurality of previously identified vulnerable basic blocks; and
the comparison of the first basic block and the second basic block indicates that the correspondence between the first basic block and the second basic block is that the first basic block shares more instructions of a same category of instructions with the second basic block than any other first-program basic block shares with any other previously identified vulnerable basic blocks.

10. The method of claim 1, further comprising:
stopping the running of backward symbolic execution at an intermediate point;
running a fuzzer on the first binary program to reach the intermediate point; and
identifying the constraints of inputs of the first binary program based on the running of the fuzzer to reach the intermediate point.

11. The method of claim 10, further comprising:
identifying an other intermediate point previously encountered by the fuzzer that is within a threshold distance of the intermediate point; and
providing input seeds to the fuzzer to reach the intermediate point in which the input seeds are derived from inputs used by the fuzzer to previously encounter the other intermediate point.

12. The method of claim 1, further comprising:
stopping the running of backward constraints symbolic execution at a first intermediate point of the first binary program;
identifying a second intermediate point that is within a threshold distance of the first intermediate point;
running forward symbolic execution on the binary program from the second intermediate point to the first intermediate point; and
identifying the constraints of inputs of the first binary program based on the forward symbolic execution.

13. One or more non-transitory computer-readable storage media including computer-executable instructions configured to cause a system to perform operations, the operations comprising:
obtaining a first basic block of a first binary program;
comparing the first basic block, with a second basic block of a second binary program in which the comparison is in response to the second basic block having been previously identified as having a vulnerability;
identifying the first basic block as a potentially vulnerable location based on a correspondence between the first basic block and the second basic block that is indicated by the comparison of the first basic block with the second basic block; and
guiding a testing execution of the first binary program toward testing of the first basic block to determine whether the first basic block includes one or more vulnerabilities based on the identification of the first basic block as the potentially vulnerable location, wherein whether the first basic block includes an actual vulnerable location is unknown prior to guiding the testing execution toward testing of the first basic block and wherein the guiding of the testing execution of the first binary program includes:
running backward symbolic execution on the first binary program starting from a location of the first basic block;
identifying constraints of inputs of the first binary program based on the backward symbolic execution; and
guiding the testing execution of the first binary program using the identified constraints of inputs.

14. The one or more non-transitory computer-readable storage media of claim 13, wherein the operations further comprise:
stopping the running of backward symbolic execution at an intermediate point;
running a fuzzer on the first binary program to reach the intermediate point; and
identifying the constraints of inputs of the first binary program based on the running of the fuzzer to reach the intermediate point.

15. The one or more non-transitory computer-readable storage media of claim 14, wherein the operations further comprise:
identifying an other intermediate point previously encountered by the fuzzer that is within a threshold distance of the intermediate point; and
providing input seeds to the fuzzer to reach the intermediate point in which the input seeds are derived from inputs used by the fuzzer to previously encounter the other intermediate point.

16. The one or more non-transitory computer-readable storage media of claim 13, wherein the operations further comprise:
- stopping the running of backward symbolic execution at a first intermediate point of the first binary program;
- identifying a second intermediate point that is within a threshold distance of the first intermediate point;
- running forward symbolic execution on the binary program from the second intermediate point to the first intermediate point; and
- identifying the constraints of inputs of the first binary program based on the forward symbolic execution.

17. A system comprising:
- one or more non-transitory computer-readable storage media including computer-executable instructions; and
- one or more processors communicatively coupled to the one or more non-transitory computer-readable storage media and configured to, in response to execution of the instructions, cause performance of operations, the operations comprising:
- obtaining a first basic block of a first binary program;
- comparing the first basic block, with a second basic block of a second binary program in which the comparison is in response to the second basic block having been previously identified as having a vulnerability;
    - identifying the first basic block as a potentially vulnerable location based on a correspondence between the first basic block and the second basic block that is indicated by the comparison of the first basic block with the second basic block; and
    - guiding a testing execution of the first binary program toward testing of the first basic block to determine whether the first basic block includes one or more vulnerabilities based on the identification of the first basic block as the potentially vulnerable location, wherein whether the first basic block includes an actual vulnerable location is unknown prior to guiding the testing execution toward testing of the first basic block and wherein the guiding of the testing execution of the first binary program includes:
        - running backward symbolic execution on the first binary program starting from a location of the first basic block;
        - identifying constraints of inputs of the first binary program based on the backward symbolic execution; and
        - guiding the testing execution of the first binary program using the identified constraints of inputs.

18. The system of claim 17, wherein the guiding of the testing execution of the first binary program based on the identification of the first basic block as the potentially vulnerable location further includes:
- stopping the running of backward symbolic execution at a first intermediate point of the first binary program;
- identifying a second intermediate point that is within a threshold distance of the first intermediate point;
- running forward symbolic execution on the binary program from the second intermediate point to the first intermediate point; and
- identifying the constraints of inputs of the first binary program based on the forward symbolic execution.

* * * * *